(12) United States Patent
Mckiel, Jr.

(10) Patent No.: US 9,122,351 B2
(45) Date of Patent: Sep. 1, 2015

(54) APPARATUS FOR DETECTING PROXIMITY OF OBJECT NEAR A TOUCHSCREEN

(71) Applicant: VERIZON PATENT AND LICENSING INC., Basking Ridge, NJ (US)

(72) Inventor: Frank A. Mckiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 278 days.

(21) Appl. No.: 13/836,716

(22) Filed: Mar. 15, 2013

(65) Prior Publication Data

US 2014/0267169 A1    Sep. 18, 2014

(51) Int. Cl.
*G06F 3/042*    (2006.01)

(52) U.S. Cl.
CPC .................................. *G06F 3/0421* (2013.01)

(58) Field of Classification Search
CPC ...... G06F 3/0421; G06F 3/042; G06F 3/0428
See application file for complete search history.

(56) References Cited

U.S. PATENT DOCUMENTS

| | | | |
|---|---|---|---|
| 4,782,328 A * | 11/1988 | Denlinger | 341/5 |
| 6,911,972 B2 * | 6/2005 | Brinjes | 345/175 |
| 8,159,474 B2 * | 4/2012 | Hauck | 345/179 |
| 2005/0073508 A1* | 4/2005 | Pittel et al. | 345/175 |
| 2010/0097353 A1* | 4/2010 | Newton | 345/175 |
| 2012/0113062 A1* | 5/2012 | Briden et al. | 345/175 |

* cited by examiner

*Primary Examiner* — Kathy Wang-Hurst
*Assistant Examiner* — Jose Soto Lopez

(57) ABSTRACT

An exemplary apparatus comprises a housing attachable to a touchscreen-equipped computing device wherein one or more image sensors in the housing obtain images of an object in the vicinity of the touchscreen and a processor analyzes the images to compute the position of the object relative to the touchscreen and communicates to the computing device attribute data pertaining to the imaged object. Exemplary methods are also described.

25 Claims, 20 Drawing Sheets

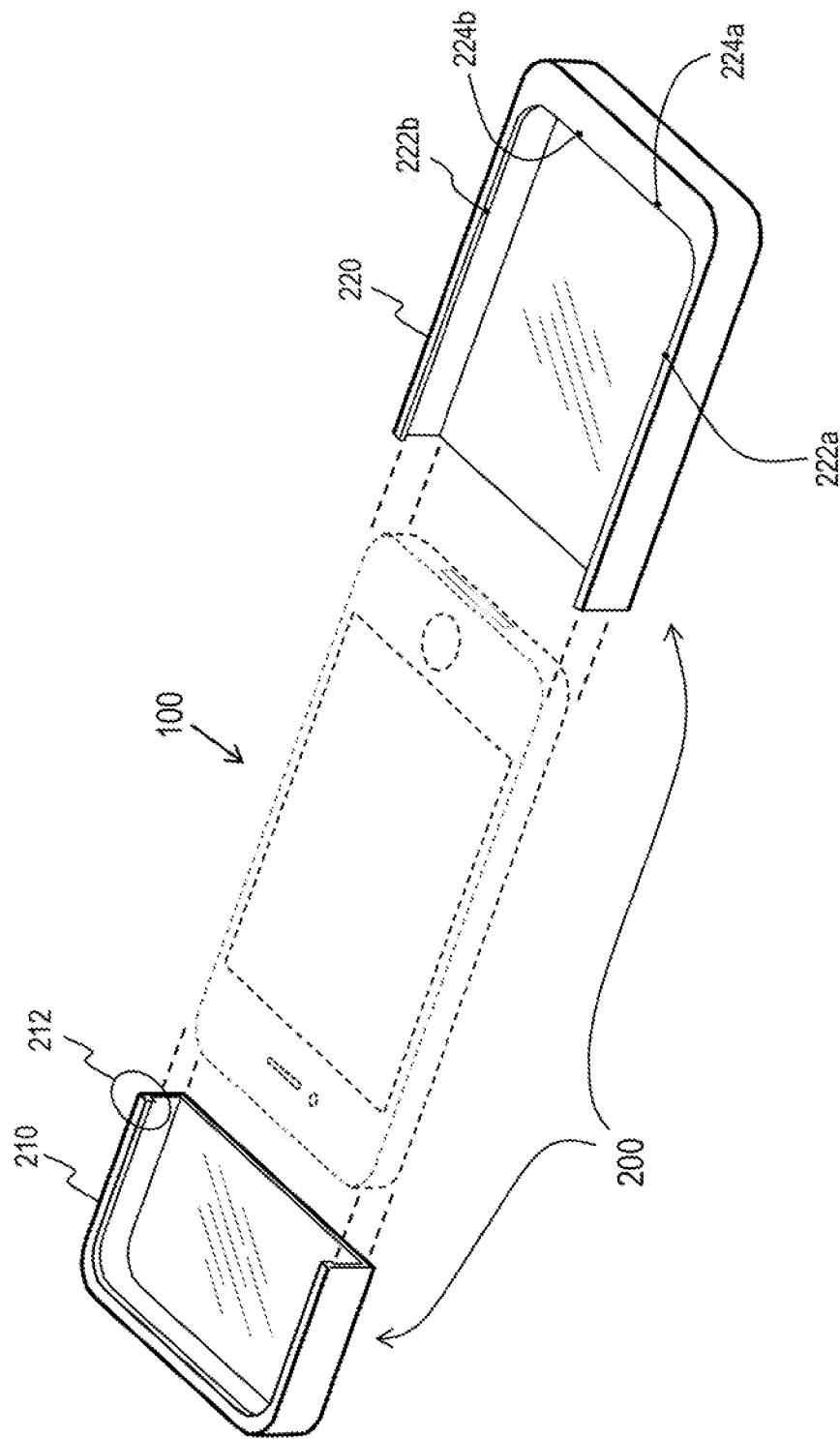

APPARATUS FOR DETECTING PROXIMITY OF OBJECT NEAR A TOUCHSCREEN

BACKGROUND INFORMATION

In recent years, mobile communication and computing devices using touch-sensitive displays, such as the 'iPhone'™ and 'iPad'™ from Apple Inc., have become commonplace. Users are typically able to directly manipulate graphically-depicted interactive elements on the user interface display by placing one or more fingertips in contact with the screen and making gestures such as tapping, sliding and pinching. Touchscreens typically comprise transparent, capacitance-sensing layers and, using well-known techniques, can sense the position of multiple simultaneous points of contact between a user's fingers and the display surface. In terms of interaction with graphical interface elements, users can simulate typing on a displayed keyboard, select icons to open applications, select text fields for subsequent textual input and scroll through lists or other contents. With many such devices, users may even scroll an entire 'home screen' or 'desktop' that displays an array of icons that each represent an application to launch or a feature to invoke.

Touchscreen devices like the iPhone and other so-called 'smartphones' rely mainly upon the visual display and touchscreen to support user interaction and consequently provide minimal physical buttons or other input mechanisms for which a user could employ tactile sense to locate and actuate. This minimization of mechanical buttons makes the user interface heavily software-driven and graphically-oriented. In some cases, however, as the finite number of gestures that are intuitive, easily remembered and readily discernible are dedicated to specific interactions, the gesture mappings become quickly exhausted. As described below, this is especially true when special needs or accessibility tools are layered on top of normally used touchscreen paradigms. Furthermore, where nearly every user interaction must take place via the touchscreen, a user who wants to freely alter some functional attribute of the device or an application must navigate through a menu hierarchy to reach a particular setting and is thus impeded from making momentary or dynamic changes to certain settings.

Blind users of such touchscreen devices are unable to see user interface elements displayed on the screen, such as simulated keyboard keys, icons, buttons and the like. However, some accommodations have been introduced, such as Apple's 'VoiceOver' accessibility feature, so that sound effects or synthesized speech inform a blind user of content or controls that correspond to the position of the user's finger as they touch the screen. To support this, application developers add descriptive textual labels in their application's interfaces so that, ideally, each visual page or control element also has a corresponding textual description that can be announced to a user by speech synthesis. Without seeing the display, a user can nevertheless probe the display and elicit audible responses until finding a desired function or control or content.

In addition to having software applications provide descriptive labels for the displayed elements, additional measures have been instituted to discriminate between a single-point touching gesture used by a blind user to explore the display and a similar single-touch that would normally signify a user's intent launch an application or act upon a control element, such as a displayed pushbutton control. As an example of this disambiguation, Apple's VoiceOver accessibility mode notably shifts the interpretation of touchscreen gestures.

Normally, in the case where a sighted user wishes to launch an application, the user locates a corresponding icon on the home screen, selected based on the icon's visual appearance that suggests its function, and then simply taps the icon once with their fingertip. The 'tap' gesture is easy to directly target with one's finger given the size and spacing of the icons.

When the 'VoiceOver mode' is active, however, the user's single-fingered input is interpreted as an attempt to probe the environment and elicit descriptive sounds. Without this provision, a blind user's attempt to merely explore the displayed icons could not be distinguished from an intent to invoke an application or otherwise act upon touchscreen-actuated visual elements. In order for a user, during VoiceOver mode, to actually take action upon an element in the same way a single-tap gesture would normally work, the user must instead perform a 'double-tap'. To be more specific, the user typically performs a preparatory exploration of the interface by touching the screen in various locations and hearing descriptive sounds for elements displayed under their fingertips. As various elements are contacted, a VoiceOver 'cursor' is shifted around to highlight the currently or most recently contacted element for which a sound was elicited.

Once the VoiceOver cursor has been used to select a user interface element, the user may subsequently execute a double-tap gesture anywhere on the screen to activate the selected control. The double-tap gesture anywhere on the screen will perform the same action that a single-tap directed at the selected element would have performed if VoiceOver mode were not active. Thus, with VoiceOver mode active, single-touch gestures effectively become intercepted and used for exploratory interaction whereas double-tap gestures are, in effect, converted to single-tap gestures as if executed upon the element that is currently highlighted.

The VoiceOver mode also entails modification of other user inputs via the touchscreen. A scrolling action, typically performed by a single finger sliding in a scroll direction, also has to be disambiguated from the motion of simply sliding around to find displayed features without activating them. Accordingly, while in VoiceOver mode, scrolling is only engaged when three fingers come into contact with the screen. (In the VoiceOver approach, two-fingered gestures are already assigned to control page-wise reading.)

While the above measures improve basic accessibility of touchscreen interfaces for blind or low-vision users, further improvements may be realized in terms of agility, ease of use, efficient use of available gestures or in facilitating a common experience to be shared among both sighted and blind users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2A is a pictorial of a housing which may be used to partially enclose a touchscreen device in accordance with principles described herein.

DETAILED DESCRIPTION OF PREFERRED EMBODIMENTS

Example devices and methods described herein provide user interface devices wherein a touchscreen is augmented by one or more additional user input devices. Some example embodiments described herein involve detecting the presence of an object, such as a user's fingertip, in close proximity to the touchscreen and determining the distance between the object and the touchscreen surface. Data pertaining to a nearby or approaching object may be reported to the touchscreen device and processed in connection with contemporaneous gestural inputs from the touchscreen to effectively increase the ease of use and range of gestural expressiveness available to a user. In an example application to benefit blind and low-vision users, the additional proximity-sensing input works in conjunction with an audible accessibility feature in the touchscreen device to improve the user experience. In at least one embodiment described herein, the proximity sensing is used to differentiate operation of an audio accessibility features by indicating whether the user is merely probing the user interface or is intending to actuate an interactive element via the touchscreen.

In accordance with some illustrative embodiments, an apparatus is provided which comprises a housing configured to attach to a computing device, with the computing device having at least one surface on which at least a portion is a touch-sensitive region operable to receive user input for the computing device. The exemplary apparatus further includes at least one image sensor array disposed in the housing in a position such that, when the housing is attached to the computing device, an image formed on the image sensor array includes: at least a portion of the surface of the computing device, a direct first view of an object near the surface, and a reflected second view of the object as reflected from the surface. The exemplary apparatus further includes a processor receiving, from the image sensor array, image data corresponding to one or more images and performing image analysis of the image data to determine attribute data for the object. The exemplary apparatus further involves a communications interface configured to communicate the attribute data between the processor and the computing device.

Example embodiments according to the principles described herein may be applied to eliciting identifying sounds corresponding to displayed objects before the user has committed to selecting or activating a particular object and preferably before the user has actually touched the screen where the object is displayed. Some example embodiments involve the use of a proximity sensor in conjunction with a host touchscreen device in order to sense the location of a user's pointing member, such as a fingertip, relative to the screen surface but before the pointing member makes contact with the surface.

Figure 1:
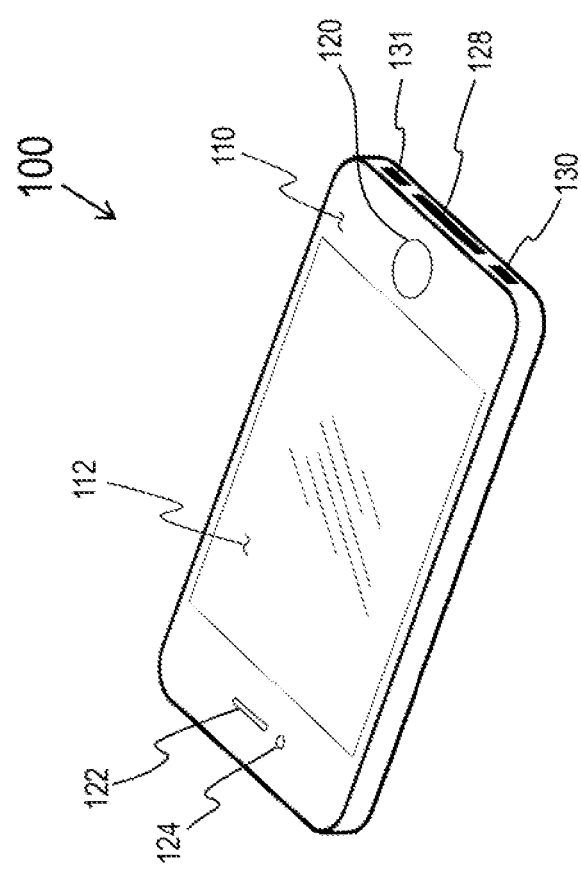
FIG. 1 illustrates a pictorial of a typical touchscreen device.

FIG. 1 shows a typical mobile computing device 100 (which may also be referred to as a 'host device' or 'touchscreen device') as one example of a suitable device to which the presently described principles may be usefully applied. Mobile computing device 100 may be, for example, an iPhone™ manufactured by Apple Inc. Mobile computing device 100 comprises a smooth, glasslike front surface 110, a portion of which is a touch-sensitive region (or simply 'touchscreen') 112 overlaying a visual display. In other words, touchscreen 112 corresponds to an area of front surface 110 that is not only a visual display but is also sensitive to contact by a user's fingertip, or other members that exhibit the capacitance, electrical conductivity or other electrical/mechanical characteristics that the touchscreen uses to sense a user's fingertip.

It should be noted from this diagram that there are some portions of front surface 110 that are not part of touch-sensitive region 112. Along those portions outside of the touch-sensitive region 112 are placed, for example, a physical pushbutton 120, a sound output portal 122, and a front facing camera portal 124. (Mobile computing device 100 also typically has other pushbuttons protruding slightly from the outer perimeter of the device but these are not shown here for the sake of simplicity. These other pushbuttons typically include an on-off switch, a silencing switch, and volume control pushbuttons.)

Mobile computing device 100 is shown to also have an electrical connector port 128 through which several types of connections may be made through a common connector. These connections provide for supplying charging current power to the device, powering of external devices from the mobile computing device's battery, connections to analog audio devices, and data connections for transferring data to and from the device. Additional sound portals 130, 131 are shown to be located alongside the connector 128. These sound portals may provide openings to an internal speaker for sound output or to a microphone for sound input, such as when the mobile computing device is used as a mobile telephone or sound recorder.

FIG. 2A is a pictorial diagram showing the manner in which a mobile computing device 100 may be fitted with an outer housing 200 that partially surrounds device 100. Outer housing 200 will be explained below to incorporate components of an external sensor apparatus to augment user input to device 100. FIG. 2A shows one example design wherein outer housing 200 comprises top half 210 and bottom half 220, which both are formed with slightly recessed channels in their side walls to just fit snugly onto the computing device and slide towards one another until joined.

One such commercially available housing that works in this manner is an external battery attachment for the iPhone called the 'juice pack'™ from Mophie, Inc. Note that each housing half comprises a slight bezel or lip 212 to slightly wrap around the edge of the mobile device and retain the mobile device snugly within the housing. In the commercially available Mophie product, these two housing halves slide together and are held towards one another by friction and interlocking tabs, which for clarity are not explicitly shown in this diagram. Furthermore, housing 200 may encompass additional openings on some surfaces to provide access to other controls and devices around the edge or on the backside of device 100, such as switches and cameras, which are not shown here for the sake of simplicity. In accordance with an exemplary embodiment, a number of light-emitting elements 222a and 222b are shown to be inset along the lip of lower housing half 220, along with some light-receiving elements 224a and 224b. The exact placement and number of these elements may vary according to design while still generally operating in accordance with the presently taught principles.

It should be noted that light-emitting or light-sensing components may also be disposed within upper housing half 210. Electrical coupling to such elements may be accomplished through mating electrical contacts between housing halves 210 and 220 or through a ribbon cable that interconnects the halves and is tucked inside of housing 200 when assembled around a device 100. Alternatively, points of light emission and light reception may be implemented within upper housing half 210 by setting the optical/electrical components within the lower housing half 220 and using internal-reflection light guides to extend optical paths from these components into the upper housing half 210. Light guides formed independently in housing halves 210, 220 during manufacture may align and achieve optical continuity when the halves are assembled around device 100.

Figure 2B:
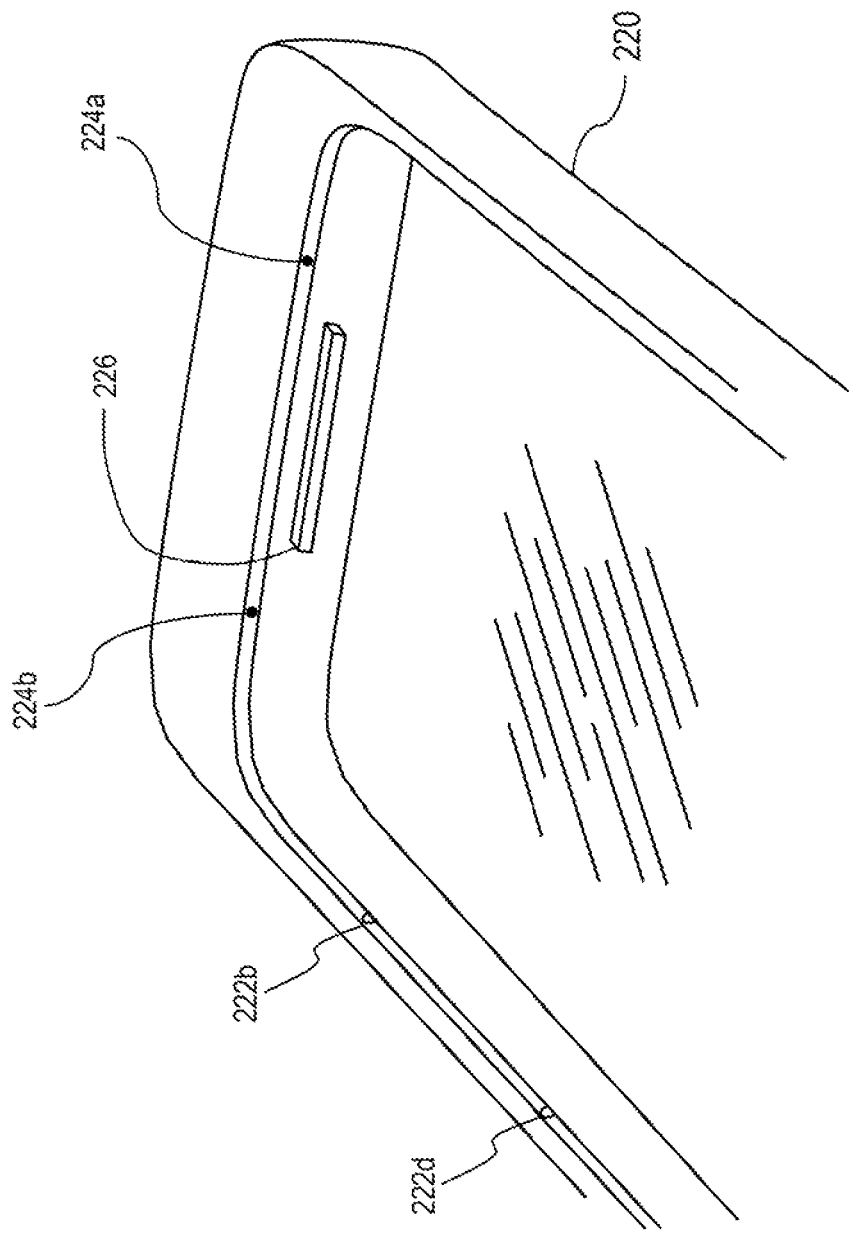
FIG. 2B is a pictorial of housing showing the placement of optical elements along the bezel of the housing in accordance with principles described herein.

FIG. 2B shows a close-up view of a lower housing half 220, again depicting locations for possible locations for light-emitting elements, such as 222b and 222d, as well as light sensing elements 224a and 224b. FIG. 2B also shows the presence of an electrical connector 226 being set back within the recess of lower housing half 220 such that when mobile computing device 100 is inserted as was shown in FIG. 2A, this electrical connector mates with the electrical connector 128 of the mobile computing device 100. As will be explained further below, this connection may be used to provide power to external sensing circuitry built into the housing and to communicate to the mobile computing device state information generated by an external sensor.

In alternative embodiments, housing 200 may comprise a single, flexible structure (created using well known processes) containing the components described above. In such a case, the housing may be designed to allow for stretching in certain areas to allow a mobile computing device 100 to be inserted into the housing 200 in a manner causing a snug fit for secure attachment. Other embodiments may use a housing 200 that is a single, rigid structure containing the components described above, but with a top portion that is open or openable (such as by a hinging area), such that a mobile computing device 100 may be slid into the housing 200 from the top portion in a manner causing a snug fit for secure attachment.

Figure 3:
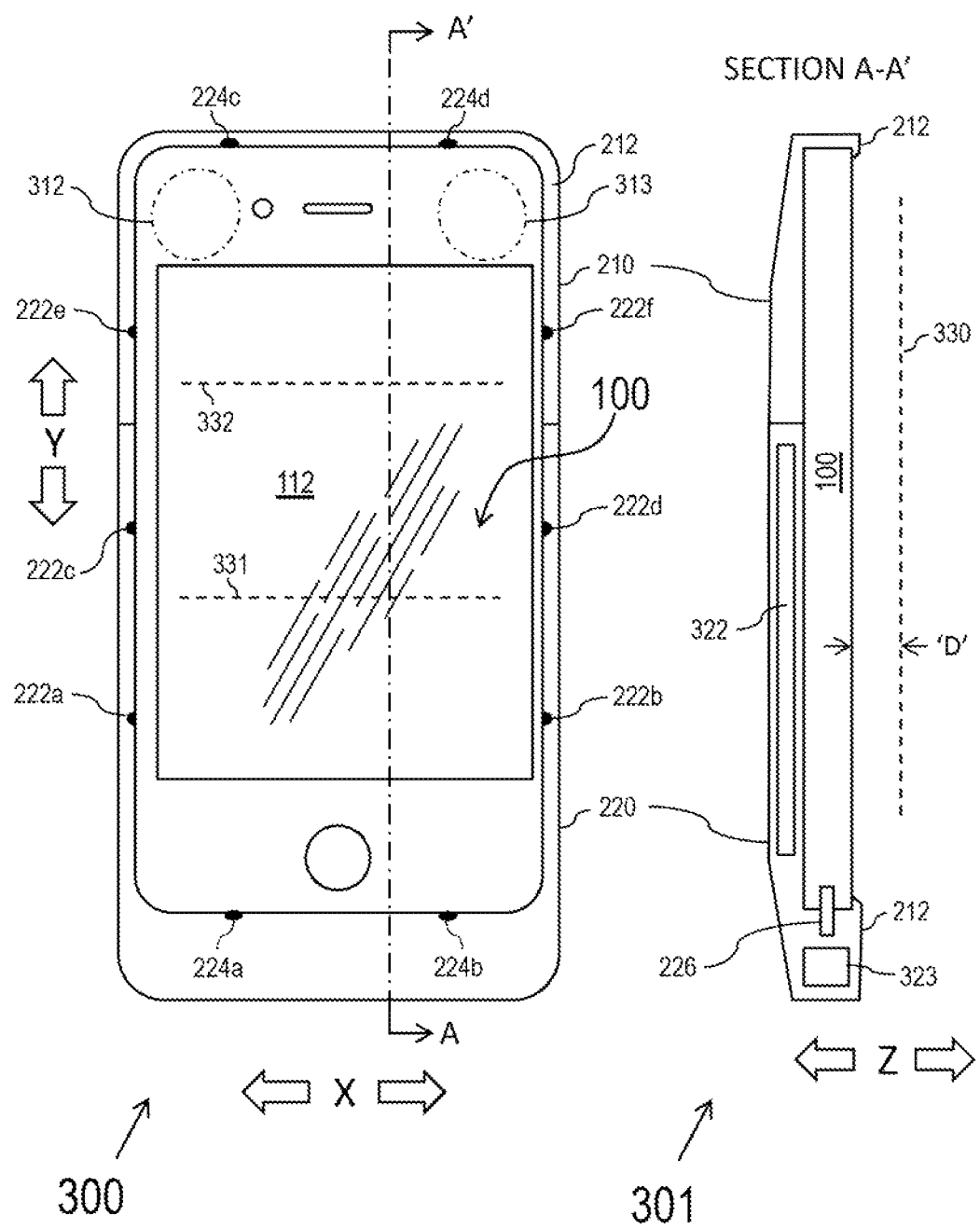
FIG. 3 illustrates front and cross-sectional views of a touchscreen device having a housing attached thereto in accordance with principles described herein.

FIG. 3 shows a front view 300 of a device 100 to which the housing 200 has been applied and secured. The lip or bezel 212 of the housing can be seen to surround the front of the mobile computing device surface, preferably without significantly encroaching on the surface or impeding a user's ability to view or touch the surface. It is evident that the exemplary lower housing half 220 and the exemplary upper housing half 210 have been slid together to encapsulate device 100. FIG. 3 also shows a cross-sectional view 301 which roughly depicts a cross-section through the assembled combination of device 100 and housing 200. In cross-sectional view 301, the preferred extent to which bezel 212 slightly wraps around the edge of device 100 is more clearly evident. Cross-sectional view 301 depicts a shape for housing 200 that may be used in an implementation wherein the housing 200 provides for an auxiliary battery for device 100. Housing 200 is seen to noticeably protrude outward away from the back of device 100 to accommodate, for example, a flat battery pack within space 322. Furthermore, cross-sectional view 301 shows a potential location, such as a cavity 323, for housing or embedding additional electronics such as an auxiliary sensor CPU and other circuitry that will be described later in conjunction with FIG. 4.

Returning to the front view 300, several possible locations along bezel 212 are noted for the placement of light-emitting elements 222a-222f, though the number and location of these light-emitting elements may vary according to design choice. Front view 300 also shows potential locations for light-receiving elements, specifically electronic cameras 224a-224d, the number and placement of which may also be decided or optimized to achieve a desired operation and coverage according to the principles described herein. The importance of the relative placement between light-emitting elements 222 and light-receiving elements 224 will become evident in the later description pertaining to FIGS. 6 through 12.

For reference, FIG. 3 also depicts the outline of regions 312, 313 on the surface of computing device 100 that are normally not touch-sensitive, but which may optionally be rendered so by the application of principles described herein.

Also superimposed on front view 300 are conceptual boundary lines 331 and 332. These represent approximate demarcations between coverage areas for a given set of light-emitting elements 222 and cameras 224. In other words, given the placement of light-emitting element 222a and camera 224a as shown in front view 300, line 331 indicates an approximate limit within which, as one progresses towards the top of the device 100, a fingertip touching the surface of the touchscreen 112 would remain adequately illuminated by element 222a for the benefit of capturing an image at camera 224a. To accomplish reliable illumination and image capture when a user touches the screen somewhere between lines 331 and 332, based upon the particular location of light emitters and cameras shown in the example of front view 300, it becomes advisable to use light-emitting element 222c to provide the appropriate 'side lighting' that helps with edge detection of the user's finger as will be pictorially shown in FIG. 7A through 7C.

An array of light-emitting elements and cameras, such as that depicted in front view 300, may be used to sense position or a proximity of a user's fingertip, or other such 'pointing member', relative to the surface of touchscreen 112 even before the pointing member actually makes contact with the touchscreen surface. In particular, principles described herein may be applied to detecting when the user's fingertip or the like comes within a threshold distance along a 'Z axis', that is, in a direction perpendicular to the plane of the touchscreen surface. The placement of this threshold distance 'D' in front of the surface of touchscreen 112 is shown conceptually by line 330 in view 301. The detection of a pointing member penetrating this threshold may serve as auxiliary input to device 100 to affect the manner in which the device operates and handles user input, especially input received via the normal touchscreen of the device around the same time that input has been received from the auxiliary sensor. Threshold distance is preferably in the range of around six millimeters to about twelve millimeters, though other threshold distances may be desirable or supported depending on implementation.

Figure 4:
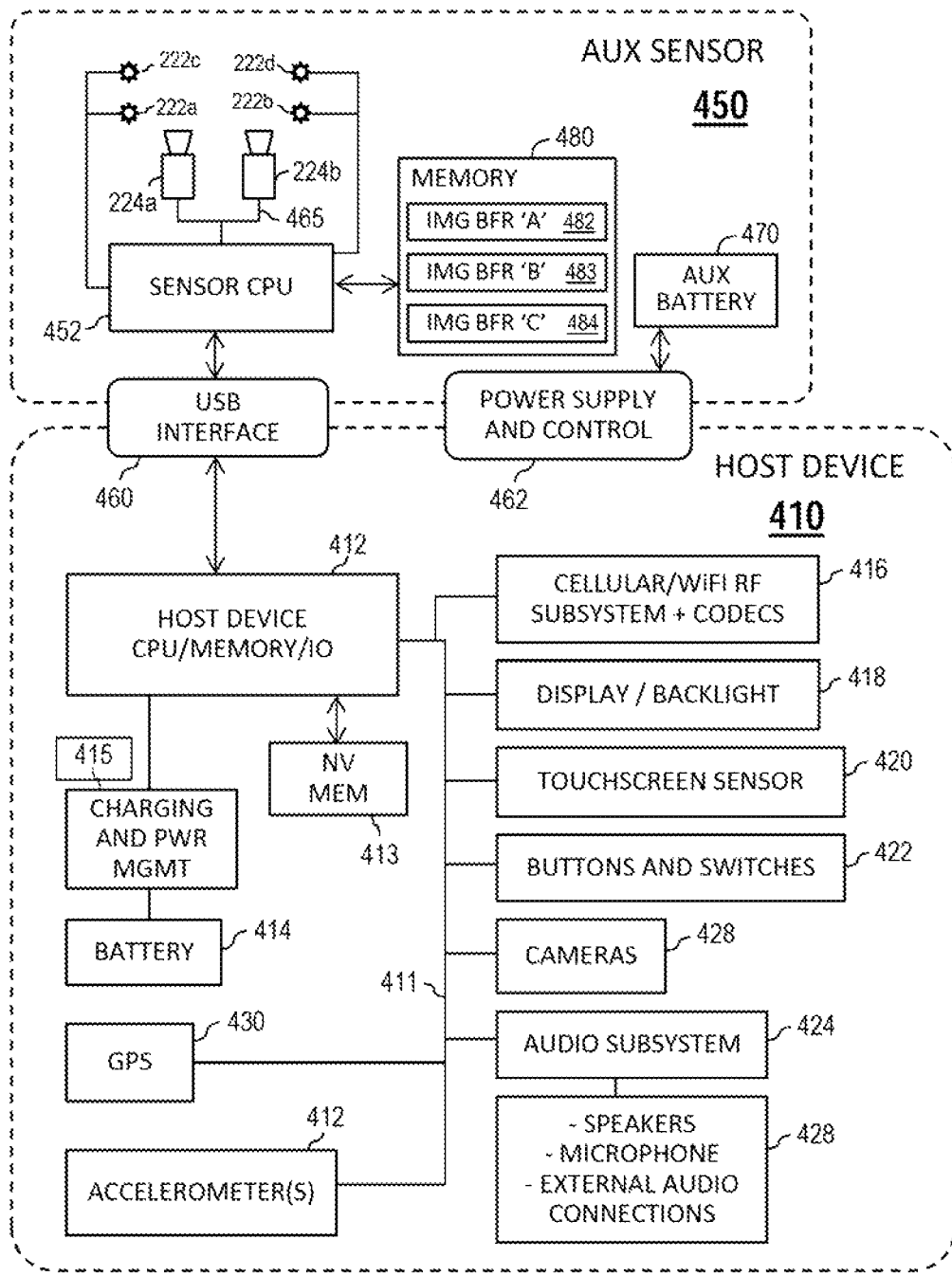
FIG. 4 is a block diagram describing hardware functional components both within a host device and an auxiliary sensor device in accordance with principles described herein.

FIG. 4 provides a block diagram 400 of the typical hardware elements within both a host device 410 (such as an iPhone) and an auxiliary sensor device 450 as an example context for illustrative purposes. Host device 410 is shown to comprise a central processing unit as well as the associated memory and input/output circuitry supporting the CPU. These are referred to collectively as 'host CPU' 412. Host CPU 412 is also coupled to a non-volatile data storage 413 which may be used for storing the device operating system, applications and other executable software, as well as user data even when no power is supplied from battery 414.

In the case where host device 410 is a mobile device, device 410 may include a battery 414, which is typically rechargeable and serves to provide power to all of the other circuits and subsystems shown in host device 410. The application of charging current to battery 414, as well as control of distribution of power from the battery to other components of host device 410 (which is particularly important in small mobile devices), is accomplished by one or more components that make up a charging and power management function 415.

Through its input/output interfaces, host CPU 412 interfaces to a variety of other components within host device 410. As shown, these typically include: a cellular and/or Wi-Fi RF subsystem along with hardware codecs 416; an LCD display along with a backlight for the display, shown collectively as reference 418; a touchscreen sensor 420 for detecting user input which overlays the display and provides for gestural control of applications which present information through the display; and various buttons and switches (collectively 422) on the exterior of the host device 410 which may include an on-off switch, along with various pushbuttons to control, for example, volume up/down.

These subsystems also typically include: an audio subsystem 424 which includes D/A and A/D converters, buffers, signal processors, analog amplifiers, electrical connectors to interface to, for example, external headphones and microphones and the like. The internal audio transducers 426 such as speakers and microphones may be used to support recorded playback of audio media as well as is to support use of host device 410 as a telephone device. Additionally, one or more cameras 428 may be included in the host device for capturing still images and video. A global positioning system (GPS) subsystem 430 may be incorporated by which the host device or applications hosted therein can determine the device's position relative to the Earth. Accelerometers 432 may be included for determining attitude of the host device with respect to the Earth's gravity, as well as to detect acceleration events.

This description of host device 410 is exemplary. Other host devices 410 may include other components in addition those described above, and may in some cases omit some of the components described above.

Turning now to auxiliary sensor system 450, it is seen that this auxiliary sensor system comprises its own sensor CPU 452, which may be housed or embedded within the wider bezel portion of lower housing 220 alongside connector 226 as was shown in FIG. 2B, such as in a cavity molded into the housing at location 323. (Materials that may be used for forming housing 200, such as thermoplastics, as well as a variety of techniques suitable for inserting or embedding electronic parts into the housing 200 are generally well known.) Sensor CPU 452 may be, for example, a microprocessor or digital signal processor (DSP) such as a TMS320-family DSP from Texas Instruments, Inc. Sensor CPU 452 is shown to be coupled to a plurality of light-emitting elements 222a through 222d. Sensor CPU 452 controls whether each of these elements is emitting light at any given moment during operation of the auxiliary sensor 450 in accordance with a control methodology described below.

Furthermore, sensor CPU 452 is shown to be coupled to a pair of cameras 224a and 224b, which may be small, low-resolution 2-D image sensor arrays deployed as small-aperture cameras and mounted within the bezel 212 of housing 200. Such image sensors or cameras, which may be of the charge-coupled device (CCD) or complementary metal oxide semiconductor (CMOS) types, or the like, are well known peripheral components on many mobile phones, laptop computers and handheld touchscreen devices like the iPhone. The cameras may interface to CPU 452 over, for example, a standard I2C bus 465 or the like in order to transfer captured image data to the sensor CPU 452 for processing of the images. Sensor CPU 452 is shown to interface with a memory 480 which in turn is shown to comprise a plurality of image buffers 482, 483, 484 for storing and manipulating image data received from the cameras. A greeter or lesser number of image buffers may be used and may be implemented as software-defined data structures residing in general random access memory (RAM) or implemented as dedicated memory structures formed in semiconductor hardware.

In FIG. 4, sensor CPU 452 coordinates the turning on of light-emitting elements 222 and the capture of images from cameras 224, processes the captured images to derive measurements, determines when a user's fingertip is detected in proximity to the touchscreen of the device and then communicates this information through a communications interface, such as USB interface 460, between the auxiliary sensor system 450 and the host device 410. This USB interface is preferably the USB interface that is already supplied with, for example, the Apple iPhone through its connector 128. In an illustrative embodiment, auxiliary sensor system 450 comprises connector 226 that mates with connector 128 and accomplishes the USB connection between sensor CPU 452 and host device CPU 412. The communications interface may take other forms, depending on the capabilities of the host device 410. For example, a near-field wireless link, such as a Bluetooth link, may also serve as a communications interface between sensor CPU 452 and host CPU 412. Likewise, other wired communications interfaces may also be used.

Power for auxiliary sensor system 450 may be obtained from the host device 410 and its battery 414 through the power supply and control interface 462. However, in an alternative implementation, auxiliary sensor system 450 may serve an added role as an auxiliary battery pack for supplying power to host device 410. FIG. 4 shows an optional auxiliary battery 470 coupled to the power supply and control interface 462 by which a battery disposed in housing 200 (such as at location 322 shown earlier) may serve to provide auxiliary power and prolong the usable 'on time' of host device 410 in addition to providing the auxiliary proximity or a so-called 'pre-touch' sensory capability according to principles described herein.

Figure 5:
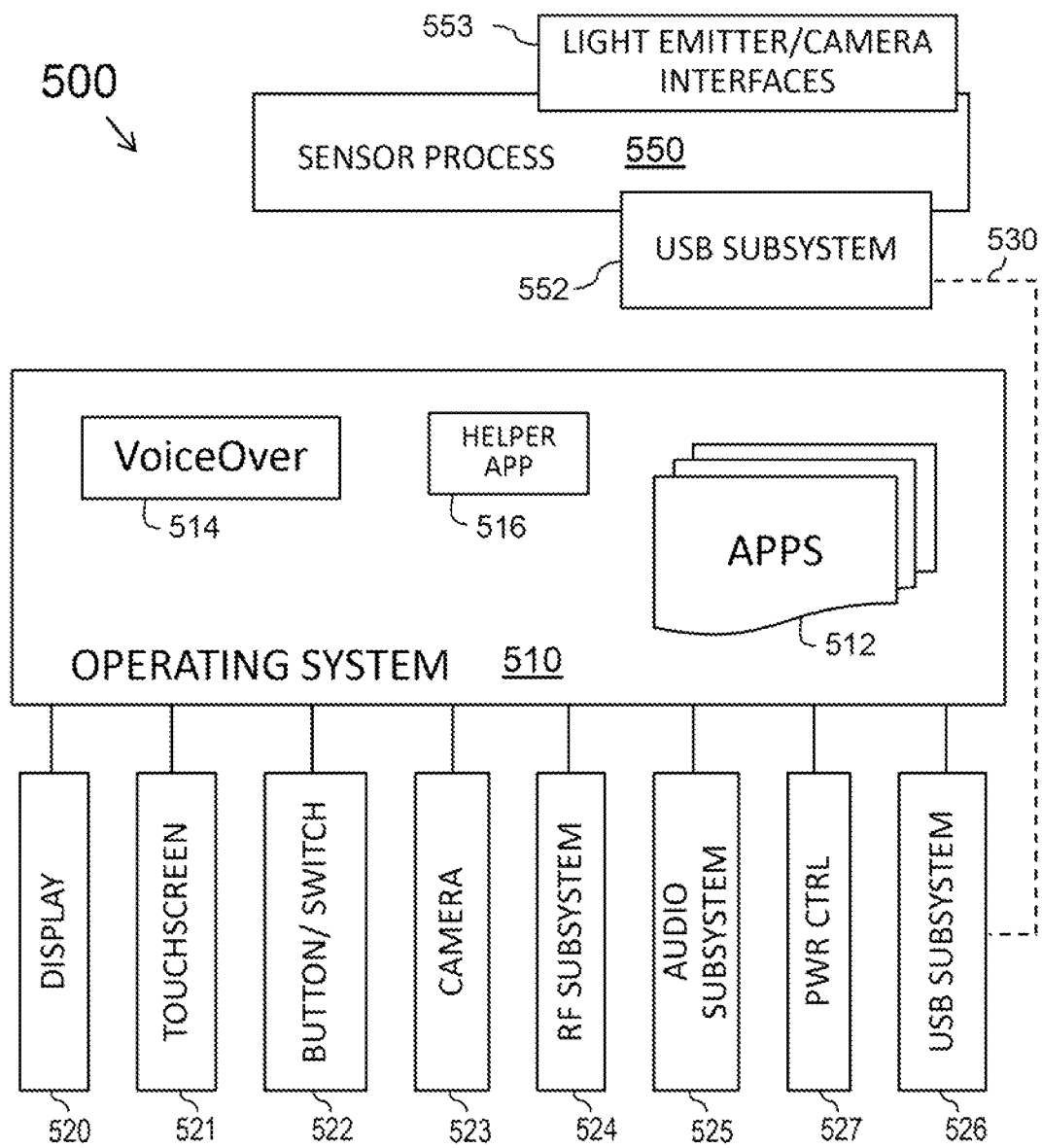
FIG. 5 is a block diagram of software functions and processes active within both a host device in an auxiliary sensor device in accordance with principles described herein.

FIG. 5 provides a block diagram 500 depicting further system components that may be implemented, for example, as software instructions that are stored and configured to execute within the exemplary host device 410 and auxiliary sensor system 450 that were shown in FIG. 4. In the bottom portion of diagram 500, the host device is seen to execute an operating system 510 which in turn manages a number of applications 512. It further includes a number of interface subsystems 520-526 to interface with various hardware elements of the host device 410, such as the display, touchscreen, buttons/switches, etc., as further described below.

One application of particular note is the audible accessibility function 514, an example of which is the well-known accessibility feature called 'VoiceOver' used in the Apple iPhone. As mentioned earlier herein, this functional component is aimed at providing blind or low-vision users with audible readout describing elements that are on the display screen of the host device and allows users to locate and interact with some of these display elements. The 'VoiceOver' functionality effectively intercepts input from touchscreen interface 521, retrieves descriptive labels associated with applications' user interface elements and provides an audible readout of the descriptive information via audio subsystem interface 525. FIG. 5 also shows the presence of a 'helper' application 516 which, in accordance with principles described herein, may be added to involve input from the auxiliary sensor and use the input to augment or modify the execution of a VoiceOver function or similar features within device 100.

In addition to the operating system 510 that supports the general functionality of the device and oversees the instantiation and execution of applications, the host device is seen to comprise a number of more specialized "lower level" subsystems which may be likened in general to device drivers in commonplace personal computers. These may also represent processes running in other processors or subsystems that communicate with and work cooperatively with the main host CPU. Where applicable, these blocks are also intended to represent low level "libraries" or APIs that may be invoked by applications to provide access to the capabilities of the hardware. These may be loaded and executed along with the operating system. These low level subsystems depicted in FIG. 5 include: display interface subsystem 520, a touchscreen interface subsystem 521; a button/switch interface subsystem 522; a camera interface subsystem 523; an RF interface subsystem 524; an audio interface subsystem 525; a USB interface subsystem 526; and a power control interface subsystem 527.

In the top portion of diagram 500, components are shown that may be implemented, for example, as software instructions that are stored and configured to be executed by, for example, the sensor CPU 452 introduced in FIG. 4. Sensor processing component 550 includes software that interacts with one or more of the sensory components of auxiliary sensor system 450, such as light-emitting elements 222 and light-receiving element(s) 224. This interaction may be facilitated through one or more light emitter/camera interface subsystems 553. Sensor processing component 550 further interacts with a USB interface subsystem 552 which provides for communication over a connection 530 with host system 410. As described further below, sensor processing component 550 interprets any notable events detected from the sensors and transmits signaling using the USB interface subsystem 552 over connection 530, to be available for use by host system 410, and in particular by an audible accessibility application 514 or other application 512 on host system 410.

Depending on specific implementation, interfaces 553 may involve different hardware and/or software-implemented components. Interfaces 553 may include current drivers for light emitters. Interface(s) 553 may also include circuits that convert analog sensor input signals into distinct binary logic signals suitable for use by sensor CPU 452. Interfaces 553 may also include multi-sensor multiplexors or serial buses, such as an I2C bus, for communication between sensor CPU 452 and sensor components such as cameras 224. Interfaces 553 may also include the so-called protocol stack software instructions which must be executed to communicate information to and from the sensor elements.

Figure 6:
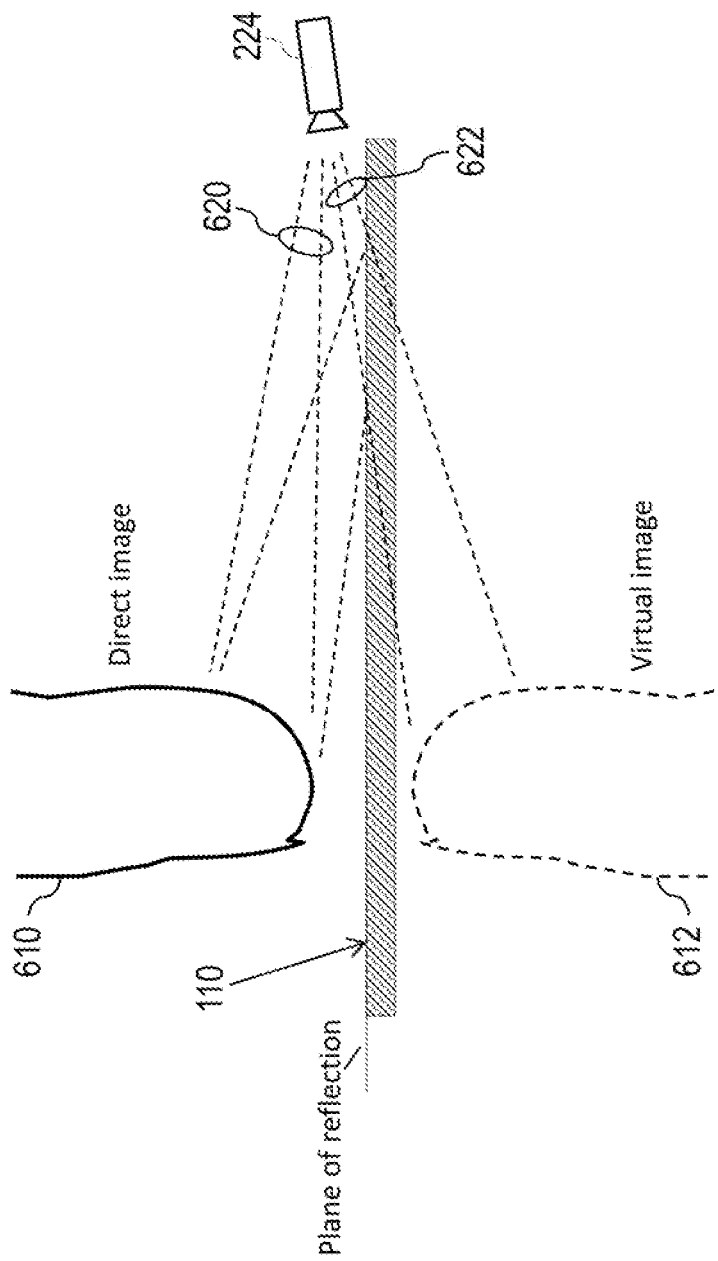
FIG. 6 depicts the manner in which direct and virtual images are observed by a camera adjacent to the surface of a touchscreen device in accordance with principles described herein.

FIG. 6 is a conceptual side view depicting the manner in which a camera 224 will receive an image of a user's fingertip as it approaches the surface 110 of a typical touchscreen device 100. This surface is usually highly reflective, or at least sufficiently smooth to act as a mirror at acute viewing angles. In FIG. 6, camera 224 is shown to be disposed very near surface 110, which acts as the plane of reflection for light rays between the user's fingertip and the camera. In FIG. 6, the tip of the user's finger is represented by direct image 610. As can be seen by a collection of rays 620 depicting straight-line travel of light signals, fingertip image 610 is within the view of camera 224. Camera 224 is designed to have a wide enough viewing angle to encompass at least a portion of the user's fingertip. Furthermore, as indicated by rays 622 that undergo reflection off of surface 110, camera 224 will also sense a reflected virtual image 612 as a 'vertically-flipped' mirror image similar to direct image 610. In accordance with a preferred embodiment, both the direct image 610 and reflected virtual image 612 captured from camera 224 will be compared and analyzed to estimate the distance between the user's fingertip and surface 110.

Figure 7A:
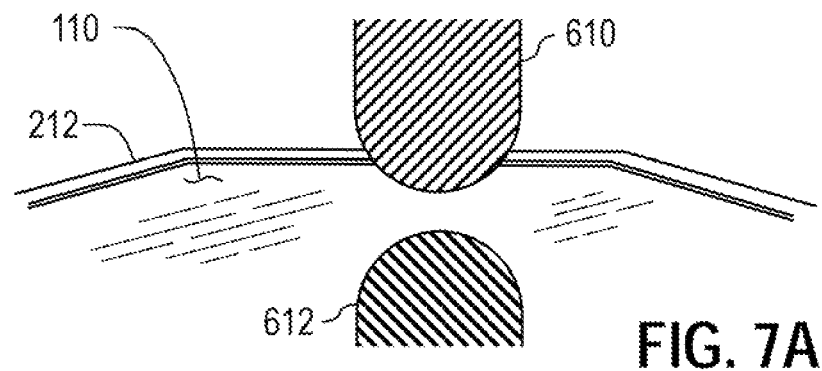
FIGS. 7A-7C depict views of a user making contact with a touchscreen under different illumination conditions in accordance with principles described herein.
Figure 7B:
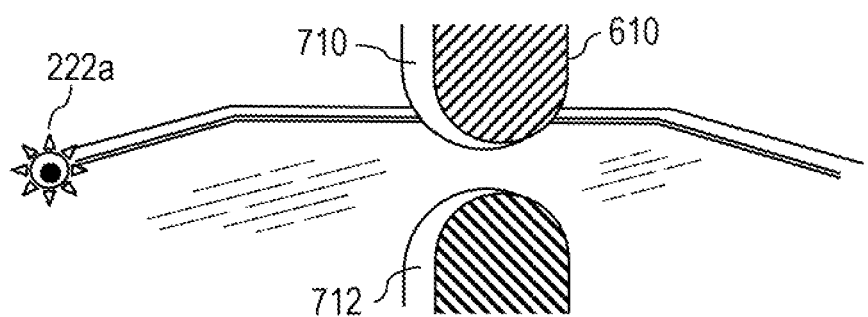
Figure 7C:
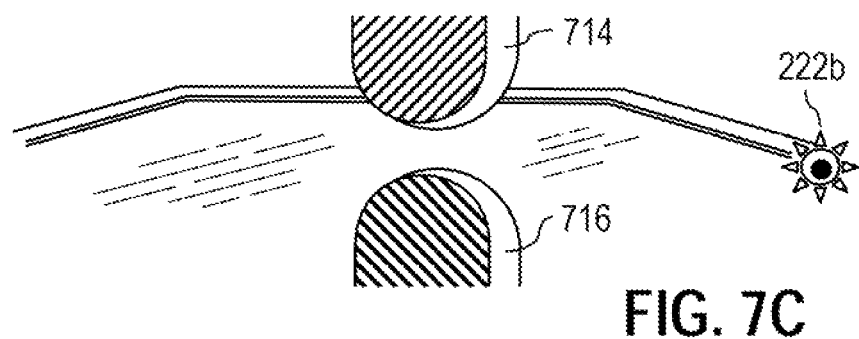

FIGS. 7A-7C pictorially represent various instances of a view as may be observed by a camera 224 according to principles described herein. In a first instance shown in FIG. 7A, an image 610 of a user's fingertip or similar pointing member is shown to be in the vicinity of a reflective surface such as the front surface 110 of a touchscreen device. Around the perimeter of surface 110 may be seen the bezel 212 of the housing that encases the touchscreen device in accordance with a preferred embodiment. In this instance, both a direct image 610 and a reflected image 612, as reflected off of surface 110, can be seen. Within a field of view of camera 224, images 610 and 612 may be referred to, respectively, as a 'direct first view' and a 'reflected second view' of the object being imaged. FIG. 7A further represents a view that is illuminated only by incidental ambient light in the vicinity of the touchscreen device (or glow from the display itself). In accordance with the principles described herein, an image comparable to FIG. 7A, which lacks illumination from any of the light-emitting elements 222, is preferably one of the images that is captured by a camera 224 and processed by sensor CPU 452.

FIG. 7B illustrates a similar circumstance as shown in FIG. 7A except that light-emitting element 222a is turned on momentarily and illuminates at least a portion of the user's fingertip that is in the vicinity of the surface of the screen. This illumination, coming substantially from the side of the user's fingertip, creates a brightened area 710 on the image of the fingertip 610. A reflected image of this brightened area 712 is also evident on the lower part of FIG. 7B. Preferably, the image of FIG. 7B is another one of the images that is captured by camera 224 and processed by sensor CPU 452.

FIG. 7C represents yet another view as may be observed by camera 224 wherein illumination of a fingertip, at the same location as previously shown in FIG. 7B, is provided instead by light-emitting element 222b. This illumination gives rise to a brightened area 714, this time on the right side of the direct image of the fingertip. This brightened area is also reflected as seen in the lower part of FIG. 7C and depicted as brightened area 718. Preferably, FIG. 7C is a third image that is captured by camera 224 and processed by sensor CPU 452. As will be demonstrated and explained next in describing process 800, the three captured images represented by FIGS. 7A through 7C may be processed in conjunction with one another to derive accurate information as to the location of the user's fingertip relative to screen surface 110 in three different axes, namely the X, Y and Z axes as were depicted in FIG. 3. Note that FIGS. 7A-7C are substantially the same view but captured contemporaneously as different instances under different illumination conditions.

Figure 8A:
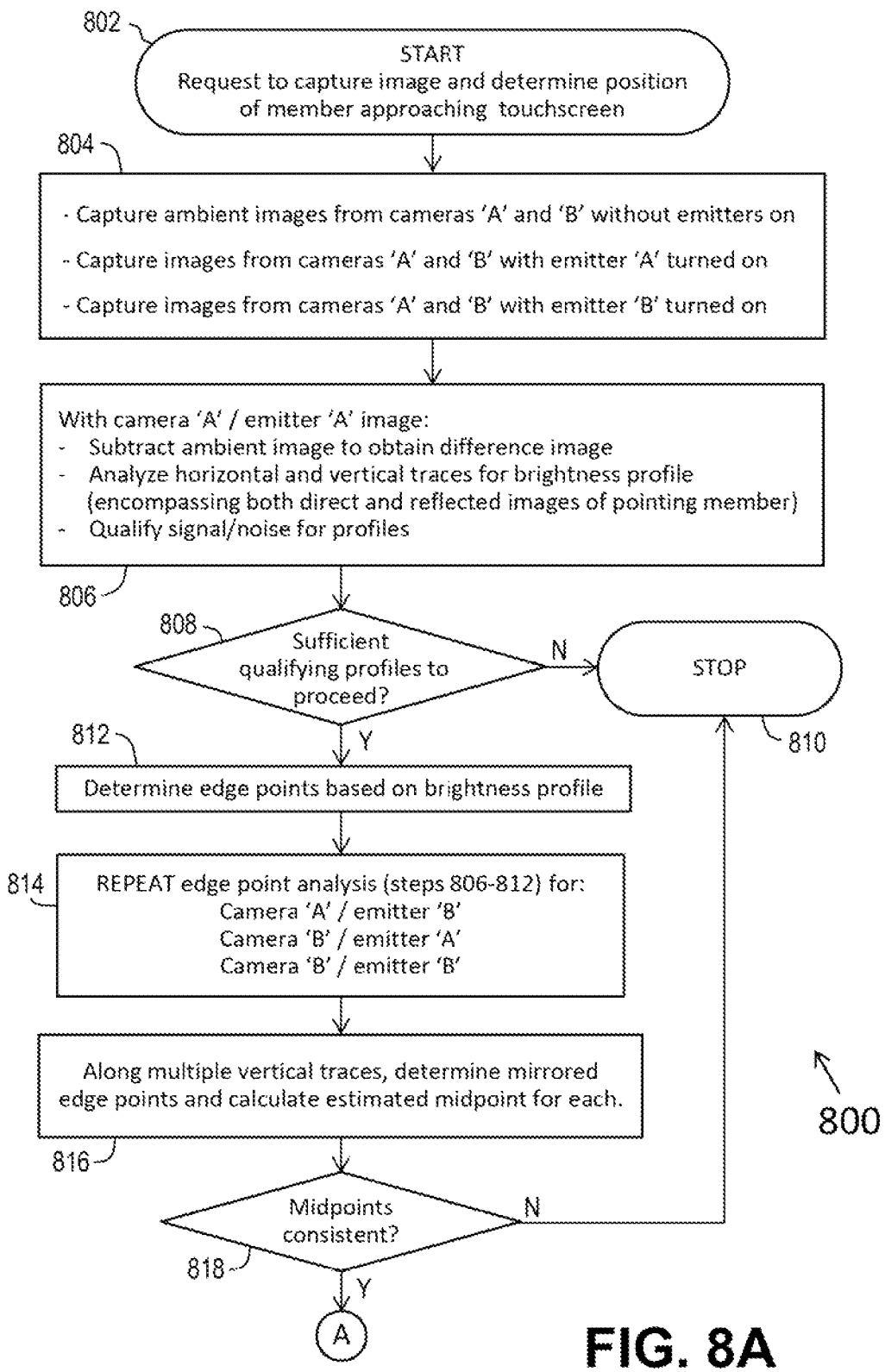
FIGS. 8A-8B describe a flowchart for an exemplar age analysis process in accordance with principles described herein.
Figure 8B:
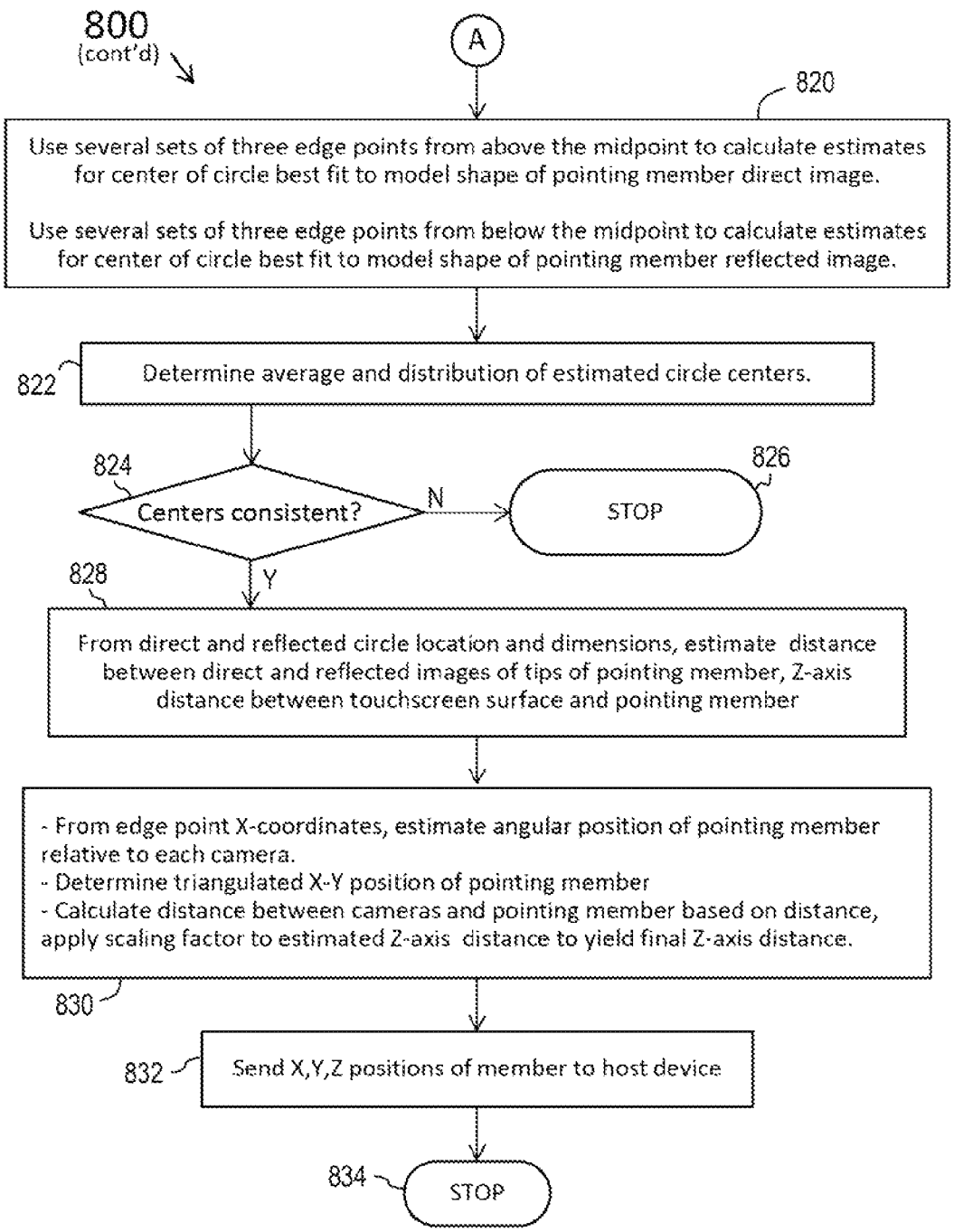

FIGS. 8A-8B describe a process 800 by which images of the type shown in FIGS. 7A-7C are obtained by controlling a combination of light-emitting elements 222 and cameras 224 and are then processed to derive estimates of the location of a user's fingertip or other pointing member in three dimensions. Process 800 commences in step 802 upon a need to capture a set of images from cameras disposed in the bezel of housing 200, to assess whether a user's pointing member (fingertip or the like) is within a measurable proximity of the surface of the touchscreen and to estimate the position of the user's pointing member.

Execution proceeds then to step 804 wherein a set of images are captured, preferably in quick succession to reduce discrepancies between the images due to motion. The images to be captured include (a) images from each one of at least two cameras without any of the light-emitting elements contributing illumination (b) images from each one of at least two cameras when the vicinity of the touchscreen surface is illuminated by a first light-emitting element; and (c) images from each one of at least two cameras when the vicinity of the touchscreen surface is illuminated by a second light-emitting element positioned differently than the first light-emitting element.

Note that these images correspond to FIGS. 7A through 7C except that each of these images is recorded by two different cameras (such as cameras 224a and 224b) at different locations within bezel 212 and are therefore recorded from two different angles.

The images captured in step 804, which may be stored in Image buffer memory such as image buffer 'A' 482 shown earlier, are then processed in step 806. Note that step 804 preferably results in the capture of at least six total images which must be processed. More than six images will be obtained if multiple rows of light-emitting elements are used (see earlier discussion regarding boundary lines 331 and 332).

In step 806, the particular image captured from a first camera 'A' while a first emitter 'A' was illuminated is initially processed by subtracting the 'ambient' image from camera 'A' that was recorded without any light-emitting elements turned on. This subtraction will result in an image that largely isolates just the brightened portions 710, 712 as shown in FIG. 7B. The remainder of the surrounding image will mostly 'cancel out'. (When ambient light conditions are exceptionally dark, a stored image taken with bezel-illumination but without a pointer in view may be substituted for the ambient image.) The next part of step 806 is to perform analysis on the difference image. More specifically, along the rows and columns within the raster image captured from the 2-D camera, a series of brightness profiles are calculated.

Figure 9:
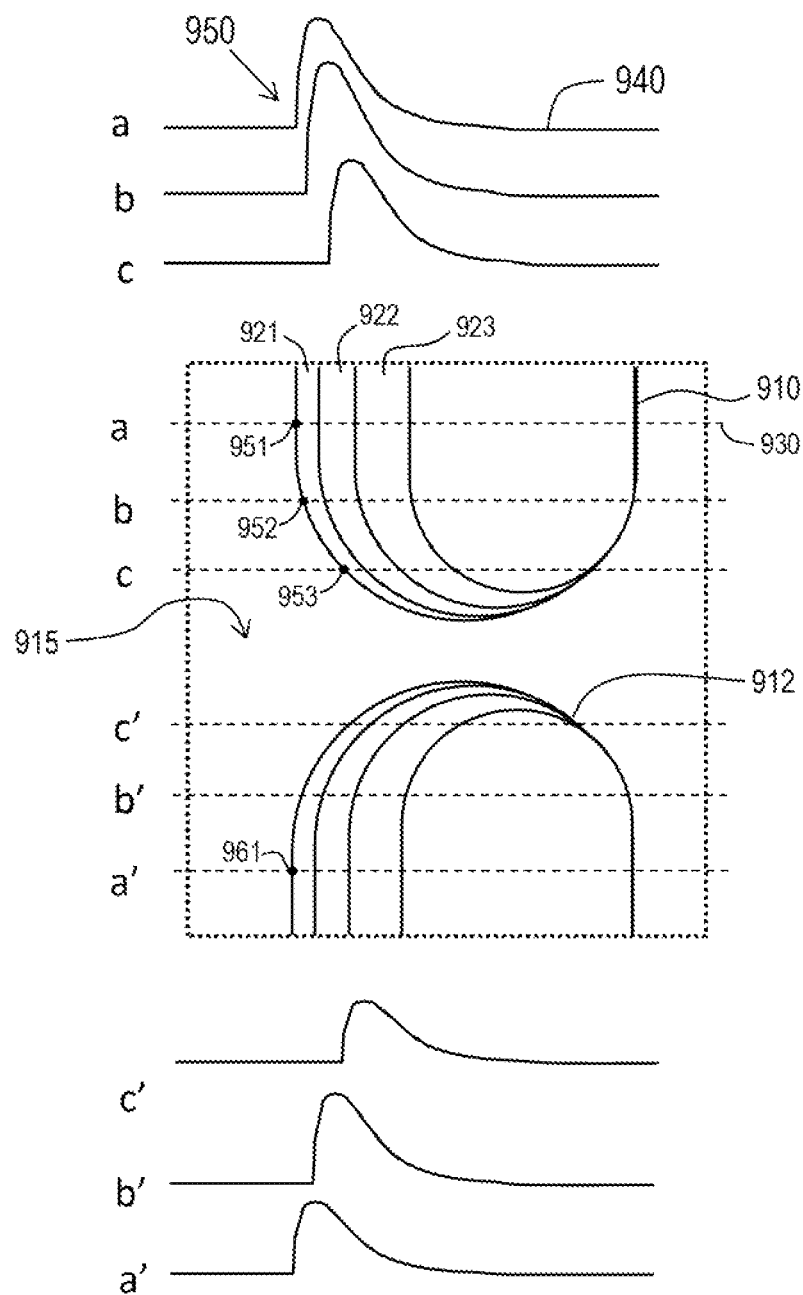
FIG. 9 depicts the derivation of brightness profiles from an image in accordance with principles described herein.

This is best illustrated by brief reference to FIG. 9 wherein the predominant part of the difference image for the directly observed pointing member is represented by an image 910 and the difference image for the reflected pointing member is represented by an image 912. Image 910 is divided by brightness contours such that subportion 921 of image 910 is particularly bright (due to the side illumination) and represents a sharp demarcation from the background part 915 of the image. A second subportion 922 of image 910 corresponds to a region of the pointing member that receives side illumination but is perhaps not as brightly illuminated as subportion 921 due to the different angle of the surface and due to being further from the light source. Finally, a third subportion 923 of image 910 corresponds to a region of the pointing member that is even less brightly illuminated. (It should be noted that the variation in brightness across image 910 likely occurs in a smooth or continuous fashion and that the delineation of the brightness into distinct regions 921, 922, 923 is merely to describe the appearance despite the limitations of the black-and-white line drawings.)

The pointing member is generally assumed to be circular or elliptical in cross-section as well as rounded towards the tip, so that modeling the observed fingertip using circles or ellipses is a sufficiently good representation for the analyses which follow. The analysis to derive brightness profiles in step 806 involves retrieval of values, such as brightness levels, from a row of camera pixels (a row in this case being along the line that is parallel to the surface of the touchscreen) as may correspond to a horizontal line 930 across image 910. (Pixel values may also be color- or wavelength-selective in connection with the light-emitting elements wavelength. The term 'brightness' used herein should be not be construed to either require or preclude the use of, for example, a three-color (e.g. RGB) camera, in which case the term 'brightness' as used herein should not be construed to require processing all three colors.) A graph 940 of the pixel values for 'scan line' 930 reveals an abrupt increase in brightness at a very distinct point 950 along the scan line.

A wavelength-specific analysis may be implemented wherein the light-emitting elements emit light at one or more specific wavelengths to which the cameras may be receptive, such as by the use of filters. Additionally, one light-emitting element may operate at a different wavelength than another. Considering FIGS. 7B and 7C, for example, light source 222a may emit green light having a wavelength of around 570 nm while the other light source 222b may emit red light of around 620 nm. Using a color camera, both light sources could be used to illuminate the pointing member simultaneously, a single image instance could be captured and the image processing could assess the outline as well as the shape of the pointing member on the basis of color. If necessary for the particular image analysis algorithm, the illumination from each source could be separated on the basis of color to yield the equivalent of two instances resembling FIGS. 7B and 7C.

It is expected that the average pointing member, such as a users fingertip approaching a touchscreen, will yield a brightness profile similar to profile 940 and will exhibit a very pronounced well-defined point 950 at which the brightness dramatically increases. The remainder of the shape of profile 940 is due to the approximately spherical or elliptical shape of the typical pointing member and in the case of a fingertip, also due to the surface texture and translucent nature of a human fingertip. A substantially different brightness profile, especially one that lacks the sharp demarcation point 950 and the notable kurtosis displayed in trace 940 may represent the presence of an object other than an intended pointing member, such as incidental contact with foreign objects as might occur when device 100 is placed in a pocket or purse.

Accordingly, the latter part of step 806 relating to quantifying a signal-to-noise ratio or other quality indicator for the brightness profile for a given horizontal or vertical trace equates to comparing the actual brightness profile obtained to a profile similar to that of profile 940. One approach for this analysis is to first perform a first derivative upon the observed profile and look for the rate-of-change to sharply peak at some point along the horizontal axis, in correspondence to the abrupt increase in brightness such as demarcation point 950.

Next, assuming a unique and sufficiently abrupt demarcation can be found in the observed profile being analyzed, then the observed profile can be mathematically compared to a prototypical profile such as the shape of trace 940. The observed profile and prototypical profile can be aligned along the ordinate and scaled in both ordinate and abscissa until a closest match is found. An adaptation of a least-squares approach may be used to achieve optimum overlap or correlation between the two profiles. Once these are aligned and normalized, a degree of overlap may be calculated by integrating the product of the two profiles over the width of the scan line. Additionally, a total error or 'misfit' value can be calculated by, for each ordinate value, subtracting one profile from the other to yield a point-wise error value. The absolute values of all of these error values may be summed (or squared and summed) resulting in an overall error.

The extent to which the observed profile can be parametrically altered to match the prototypical profile may be expressed as a ratio of the similarity integral divided by the total error, which ratio may be called a 'signal-to-noise ratio' or a 'quality factor'. A high ratio can indicate the likelihood that an observed image is indeed an approaching fingertip attempting to interact with device 100, whereas a low ratio may indicate some foreign object making incidental contact.

It should be noted that, even under ideal circumstances wherein a fingertip is illuminated by one of the light-emitting elements as shown in FIG. 7B, there will often be some row-wise profiles for which the prototypical profile 940 will not match. In FIG. 9, for example, there will be some rows of camera pixels that fall between the direct and reflected fingertip images and will lack any sharp demarcation point comparable to point 950. Therefore, rather than requiring that all horizontal rows of pixels exhibit a profile similar to 940, the number or proportion of rows that exhibit, a profile noticeably similar to 940 is evaluated in step 808 of process 800.

Figure 10A:
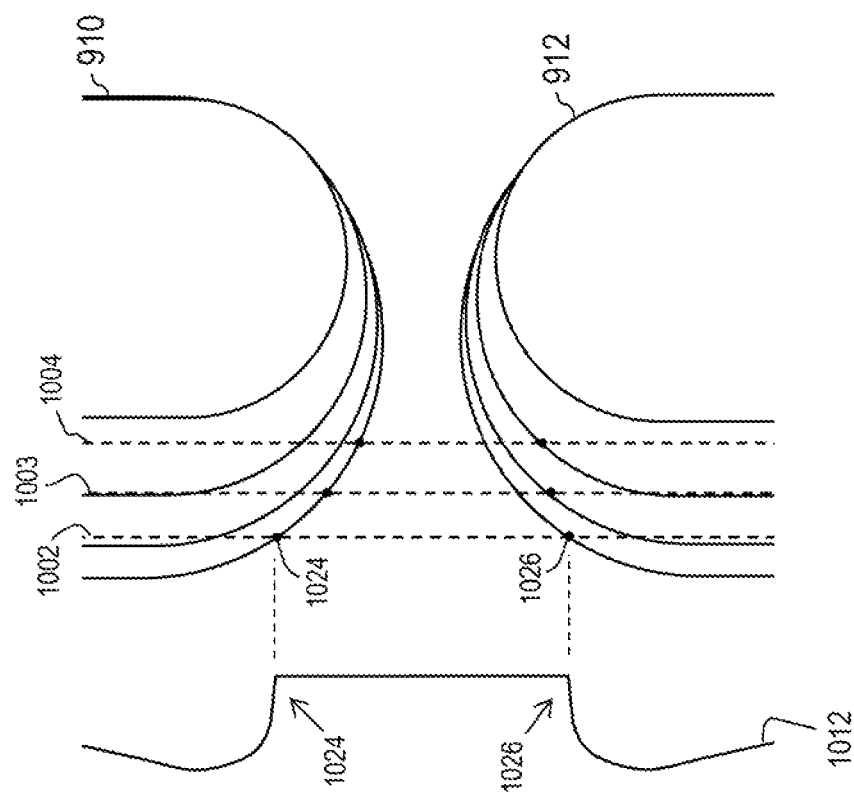
FIGS. 10A-10B depict the determination of proximity estimates from an image in accordance with principles described herein.

As another part of the analysis of step 806, a very similar process to what is described in FIG. 9 may be performed along substantially 'vertical' lines, that is, involving retrieval of pixel values that correspond to columns, rather than rows, on each camera's image sensing element. This process may be explained by brief reference to FIG. 10A. In FIG. 10A, an analysis of brightness of pixels along a column 1002, or along a substantially vertical direction normal to the plane of the touchscreen as seen by the camera, yields the brightness profile 1012 as shown from which two distinct demarcation points 1014, 1016 are distinguishable. These relatively 'vertical' profiles may be evaluated in terms of fit to a prototypical profile using, for example, a least-squares approach.

Step 808 involves a determination as to adequate quality of the profiles derived in step 806. If an insufficient number of row-wise profiles and column-wise profiles is found within the image analysis of step 806 (by comparison of the signal-to-noise ratio for each line of pixels compared to some threshold, for example) then the set of images is deemed unsuitable or invalid for further analysis, possibly because what is being captured by the cameras is other than a fingertip approaching the touchscreen. If this is the case, then no further analysis of the particular set of images is performed and process 800 concludes (at least with respect to the one set of images) in step 810.

As in the present example, the set of images may pertain to a pair of cameras in conjunction with a pair of light emitters, though the actual number of cameras and illuminators may differ subject to design choice. Given that the touchscreen surface may be divided up into territories (see earlier discussion regarding lines 331, 332) covered by different illuminators, the entirety of process 800 may be repeated for each unique set of cameras and illuminators. Thus, where process 800 is presently described as 'stopping' in steps 810, 826 due to inadequacies within one set of images, it should be understood that other sets of images captured around the same moment in time may be analyzed successfully and yield a final result as in step 832.

Returning to step 808, if there is a sufficient number of qualifying profiles to proceed with further processing of the images, then execution proceeds to step 812 to determine a collection of edge points, such as edge point 951, corresponding to a plurality of observed profiles that resemble profile 940 shown in FIG. 9. Edge points, such as points 1024 and 1026, are also calculated for traces of profiles along the vertical direction as depicted in connection with FIG. 10A.

Step 812 essentially involves edge detection to identify a specific point, such as point 951, expressed as a row and column coordinate on the camera sensor or, correspondingly, in X and Y coordinates within the camera's point of view. The same analysis can be repeated for many 'horizontal scan lines' to determine a set of points, similar to specific point 951, that describe the visually detected outer curvature of image 910, at least on the side of the image that is brightly illuminated from a light-emitting element. Furthermore, as shown in the lower portion of FIG. 9, this analysis can be repeated for the reflected image 912 to derive a series of points, such as point 961, expressed as X and Y coordinate pairs and collectively describing the outer curvature of image 912.

Thus, as seen in FIG. 10A, along the vertical scan line 1002, the outline of images 910 and 912 are partly defined by identified points 1024 and 1026. A similar analysis applied to other pixel columns 1003 and 1004 will yield a series of other points further describing the outline of images 910 and 912 as seen by a camera 224.

While the image processing steps 806 through 812 describe the steps using the combination of what are arbitrarily named 'camera A' and 'emitter A' as an example, step 814 in process 800 provides that the same steps 806-812 are to be repeated with other images in the context of camera-emitter pairings. By the action of step 808, a poor match of an image to the expected brightness profiles for any one of the analyses will abort the entire processing of the particular set of images that were captured in step 804, although other camera-emitter combinations from around the same time may still be analyzed.

Figure 10B:
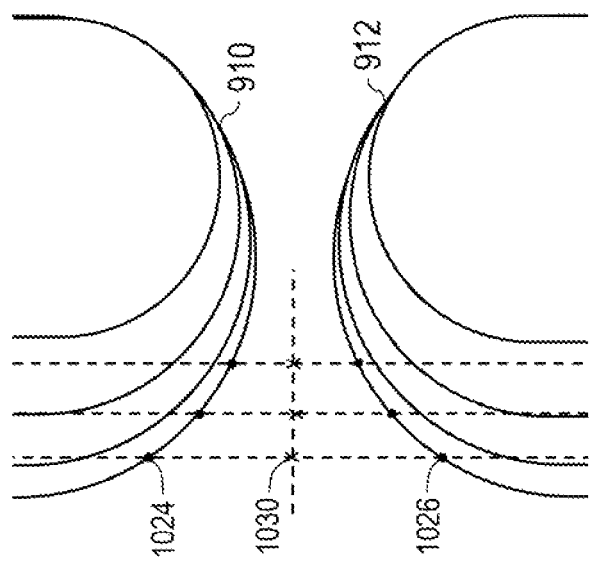

Once edge points have been gathered for all camera-emitter image combinations in step 814, and if the images have satisfied the criteria of step 808, then execution proceeds to step 816. In step 816, for the distinct points such as 1024, 1026 along scan lines 1002 that have been identified for a variety of scan lines 1003, 1004, etc., each such pair of points along a given scan line have their Y-coordinate values averaged to yield an estimated midpoint 1030 as depicted in FIG. 10B. This midpoint is halfway between a first point along the outline of image 910 and a corresponding second point along the outline of reflected image 912. This process is repeated and a number of similar midpoints 1030 are accumulated across a plurality of vertical scan lines or pixel columns.

Returning to process 800, step 818 involves reviewing the degree of similarity and consistency among numerous midpoints 1030 that have been calculated. In the case of idealistic images such as 910 and 912, the set of calculated midpoints 1030 are expected to be very consistent. In processing the array of midpoint values, determining the degree of consistency may involve assessing the range, variance, standard deviation or the like. Substantial inconsistency in these midpoint calculations may represent an image that corresponds to something other than a simple pointing member (user fingertip) approaching a touchscreen. Accordingly, as with step 808, the analysis is aborted in step 810 to avoid performing errant positional estimates based on images that are likely not user fingertips.

If, in step 818, the collection of calculated midpoints 1030 is sufficiently consistent, then execution proceeds, as indicated by connector 'A', to step 820 shown at the top of FIG. 8B. In step 820, groups of edge points 951, taken three at a time, are used to calculate the center of a circle that best models the shape of image 910. In practice, it is useful to select points where the slope of the edge of image 910 is approximately 1 or −1, rather than where a tangent to the edge is nearly vertical or horizontal with respect to the camera's view. Referring to FIG. 9, it can be seen that edge points 951, 952, and 953 may be used to reliably estimate the approximate center for a circle that would match the outline of image 910. In contrast, selecting a set of three points from above scan line 930, that is, further up the user's fingertip, will lead to unreliable calculations because the edge points begin to become both irregular and collinear further up the user's finger. Furthermore, for given set of three points, it is important not to select three points that are too close together along the contour of image 910 because this would lead to a magnified sensitivity to slight variations in the positions of the points. Accordingly, the choice of triplets of edge points from which to calculate the center of a 'best fit' circle may take into account the reliability of certain combinations of edge points.

Figure 11:
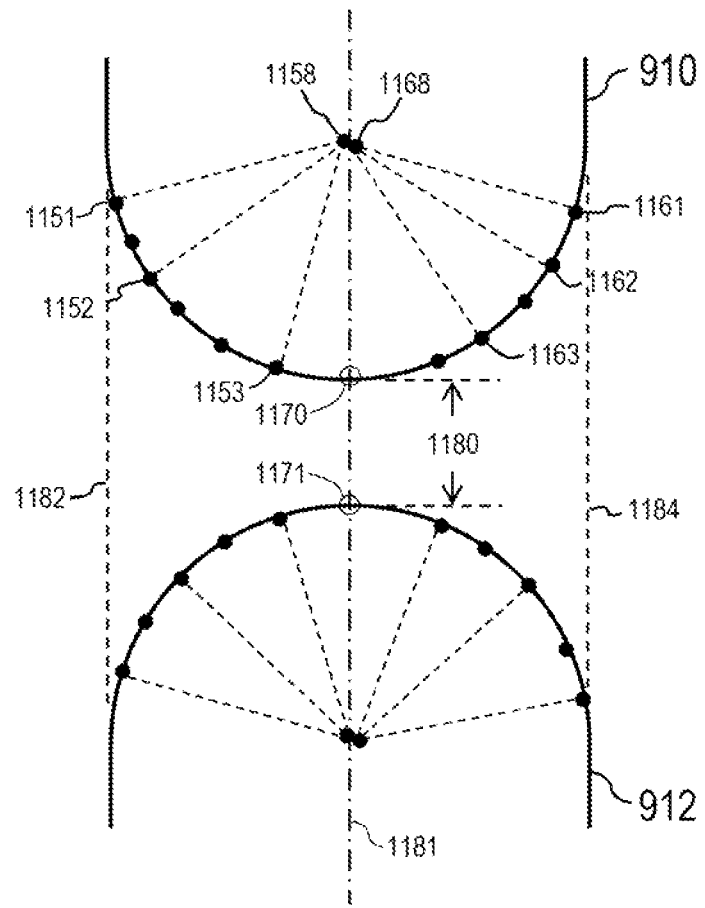
FIG. 11 depicts image analysis to estimate the center of a pointing member image in accordance with principles described herein.

The action of step 820 is depicted conceptually in FIG. 11 wherein a few example groups of three points are processed to calculate an estimated center for a circle. For example, a first group of three edge points derived from an image 910 is shown to comprise points 1151, 1152, 1153 for which an algebraic solution can determine an estimated center location 1158 for a corresponding circle that would pass through all three points. A second group of three edge points (in this case, likely derived from illumination from an opposite side compared to the first group of points) is shown to comprise points 1161, 1162, 1163 with the resulting calculation for a circle center being at point 1168. An arbitrary number of such evaluations involving triplets of edge points can be performed to derive further estimated circle centers. A similar process may be applied to edge points determined along reflected image 912.

Referring back, to process 800, step 822 corresponds to averaging a number of such circle center determinations, such as center points 1158, 1168, and perhaps many other estimated center points that have been calculated from triplets of edge points. A single point representing the average of all these center point calculations can be derived and then a distance metric between each of the estimated center points and the average center point can be used to calculate a distribution or degree of consistency among the center point estimates. The degree of consistency among numerous circle center point estimates serves as yet another indicator of the likelihood that the images being analyzed correspond to a pointing member approaching the touchscreen surface rather than being some foreign object coming into incidental contact with the touchscreen surface. In step 824, the degree of consistency of the center point estimates is assessed and, if found inadequate, then the images captured in step 804 are declared invalid for making a reliable measurement and process 800 can terminate at step 826. Alternatively, if, in step 824, the estimated circle centers are sufficiently consistent with one another, then execution process 800 continues to step 828 to estimate the distance 1180 between the lowermost extreme 1170 of direct image 910 and the uppermost extreme 1171 of reflected image 912.

While the images 910 and 912 could conceivably be more directly analyzed to assess the visual distance 1180, the above process for checking conformance of the candidate fingertip image to a 'shape model', such as a circle, ellipse or other curved shape, provides for a more robust image analysis that is relatively immune to "false positive" indications. Furthermore, given the practical limits on focal depth and camera resolution, plus the inability to control ambient lighting, this modeling approach gives better results by integrating across an entire image rather than trying to make precise measurements using a small portion of the image. Other shape models, including asymmetrical or non-geometric models may be used, particularly if an implementation calls for a user fingertip to be recognized from a side view rather than from underneath.

Another advantage to modeling images 910 and 912 as best-fit circles relates to reliably determining the effective centerline 1181 along which the converging fingertip images would eventually contact the touchscreen surface. When a similar analysis repeated from the point of view of two different cameras disposed in different locations along bezel 212, then a triangulation approach can be applied to accurately determine the position, in touchscreen coordinates, that is directly under the user's pointing member.

The distance between the direct and reflected images of the user's fingertip can be calculated from the averaged circle centers calculated in step 820 and the calculated radii of these circles (which should be nearly identical). That is, one may calculate the distance between the upper circle center and the lower circle center and subtract from this distance the upper circle radius and the lower circle radius—the remainder will be the distance 1180. Determining distance 1180 and dividing by two yields an estimate of the distance between the user's fingertip and the surface of the touchscreen. This observed distance, expressed in a number of pixels across the camera sensor, may optionally be scaled in consideration of how far the user's fingertip is away from the camera. As will be described later, triangulation based on views from two different cameras may be used to estimate the finger-to-camera distance to enable calculation of a corrected distance 1180.

Step 830 refers to analyzing the X coordinates of centerlines 1181 calculated from the standpoint of two different cameras, estimating the angular position that the X coordinate corresponds to, and performing, for example, a trigonometric calculation, to determine the X and Y position (in the sense of the 'X' and labels relative to the touchscreen surface as shown in FIG. 3) at which the user's pointing member is seen. (An example triangulation technique will be described in conjunction with FIG. 12.) Step 830 also includes the process by which, once the X and Y positions of the pointing member are determined, then the distance from the one or more of the cameras can also be ascertained and, from that, the distance 1180 calculated earlier can be scaled correspondingly. In other words, if the triangulated X and Y positions of the pointing member indicate that the pointing member is very near the cameras, then the distance 1180, which might be overestimated, is scaled down to take into account the perspective distortion. Likewise, if the pointing member is determined to be relatively distant, such as on the far side of the touchscreen surface compared where the cameras are located, then the distance 1180 may need to be scaled higher to avoid otherwise underestimating the distance between the pointing member and the touchscreen surface.

Once the X, Y and corrected Z coordinates have been calculated in step 830 then, in step 832, the auxiliary sensor sends this information to the host device. Step 832 may correspond to transmission of information messages or events from sensor process 550 through USB subsystem 552, connection 530 and the host USB subsystem 526. Upon calculating and sending the X-Y-Z coordinate set, then process 800 concludes in step 834 and a single valid measurement of the pointing member in three dimensions has been completed and reported to the host.

Note that the actions of steps 808, 818, 824 ensure that the direct and reflected views of a candidate object image meet certain image quality criteria, although a different set of criteria and tests may be employed as a matter of design choice. Although in the illustrative embodiment shown, process 800 culminates in step 823 by reporting X, Y and Z coordinates to the host device, an alternative involves further processing of these visually measured coordinates within sensor CPU 452 and then sending the processed results to the host device in lieu of 'raw' X, Y and Z measurements. The division of functional roles among the sensor CPU and host CPU is a matter of design choice and principles described herein may be equally applied regardless of the degree to which sensor CPU further processes the image-derived data or applies additional logical determinations of the type described below.

Figure 12:
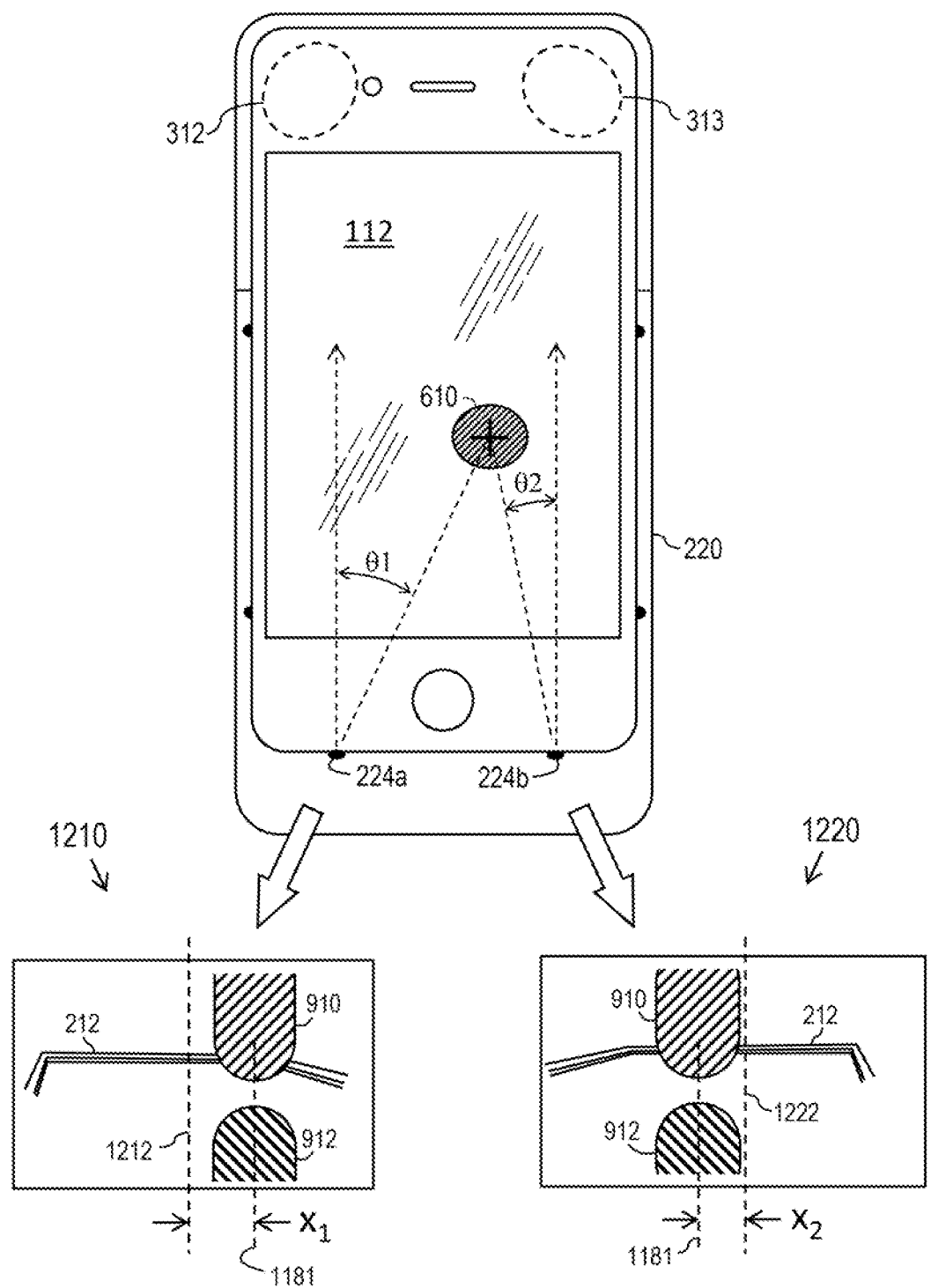
FIG. 12 is a pictorial describing analysis of two images to calculate the location of a pointing member in accordance with principles described herein.

FIG. 12 illustrates how different views from two cameras 224a and 224b disposed along the bezel of housing 220 can be used to determine the location of a pointing member 610 relative to the boundaries of touch-sensitive region 112. Once the centerlines 1181 of the best fit circles are determined (as described in conjunction with FIG. 11, for example) then the respective X-coordinates of the centerlines from the point of view of each of the cameras can be converted into an angular position, shown here as an angle between the observed position and the centerline for the point of view of the camera. In other words, the distance in pixels where the centerline 1181 of the fingertip image has been calculated compared to the horizontal centerline 1212 of the camera's view (X1) can be converted into an angular difference called 'theta one'. Likewise for the second camera, a similar distance between the centerline 1181 and the central line of view 1222 of the camera (X2) may be converted into an angular difference called 'theta two'. Given the distance between camera 224a and camera 224b, it is then possible to calculate the distance from the cameras to the pointing member 610. As derived from image analysis, 'theta one' is a first positional coordinate of the object within the field of view of one image sensor array, namely camera 224a. Likewise, 'theta two' is a second positional coordinate of the object within the field of view of camera 224b. One or more third positional coordinates, such as an X or Y value describing the location of the object expressed in touchscreen coordinates, are then to be computed based upon the first and second image-derived positional coordinates.

While a variety of techniques may be used for calculating the position of pointing member 610 based on the views observed by the cameras, a relatively simple technique involves the following steps. First, an imaginary Cartesian coordinate system may be envisioned overlaid upon the surface of the device and its touchscreen. The Y axis in this coordinate system passes through both cameras. The location of camera 224b is taken to be the origin of the coordinate system and camera 224a is defined as being at coordinate (0, W) where W is the distance between cameras 224a and 224b. To further simplify calculations, a pre-calculated array of values is prepared that maps pixel offset values, such as X1 or X2, to the slopes of lines passing through the camera locations. (This array avoids real-time calculation of squares, square roots and trigonometric functions.) Thus, when camera 224b observes an offset, such as offset X2, this may be correlated to the slope M1 of a first line, drawn in the imaginary coordinate system, that conceptually passes through camera 224b. Likewise, a pixel-wise offset observed by camera 224a, such as offset X1, may be mapped to the slope M2 of a second line conceptually passing through camera 224a. The slope-intercept equation for the first line becomes $Y=M1(X)+0$ and for the second line becomes $Y=M2(X)+W$. Solving for the point of intersection between the two lines yields the equation: $X=W/(M1-M2)$; where X is the offset of the centerline of pointing member 610 away from a conceptual line passing through camera 224a and 224b and expressed in the same units as measurement W. Furthermore, substituting this solved X value into the equation for the first line yields the corresponding Y value, which is the position of the centerline of pointing member 610 along an axis that runs parallel to the line joining camera 224a and 224b. This offset is expressed with respect to the centerline of the point of view of camera 224b. The resulting X-Y coordinate pair can be transposed and offset to derive a final description of the pretouch location of the pointing in terms of the host device's touchscreen coordinates.

It is worth noting that the triangulation process just described may encompass measurements of the position of pointing member 610 that extend beyond the limits of the touchscreen 112, per se, and may include areas that are not normally touch-sensitive, such as regions 312 and 313 explained earlier. Implementations according to principles taught herein may be usefully applied to providing a rudimentary indication of a user's touch-like input even at some locations where the host device itself is not sensitive to touch input. Example applications for this form of additional input are described in co-pending U.S. patent application entitled "Method and Apparatus for Facilitating Use of Touchscreen Devices" Ser. No. 13/838,603.

Figure 13:
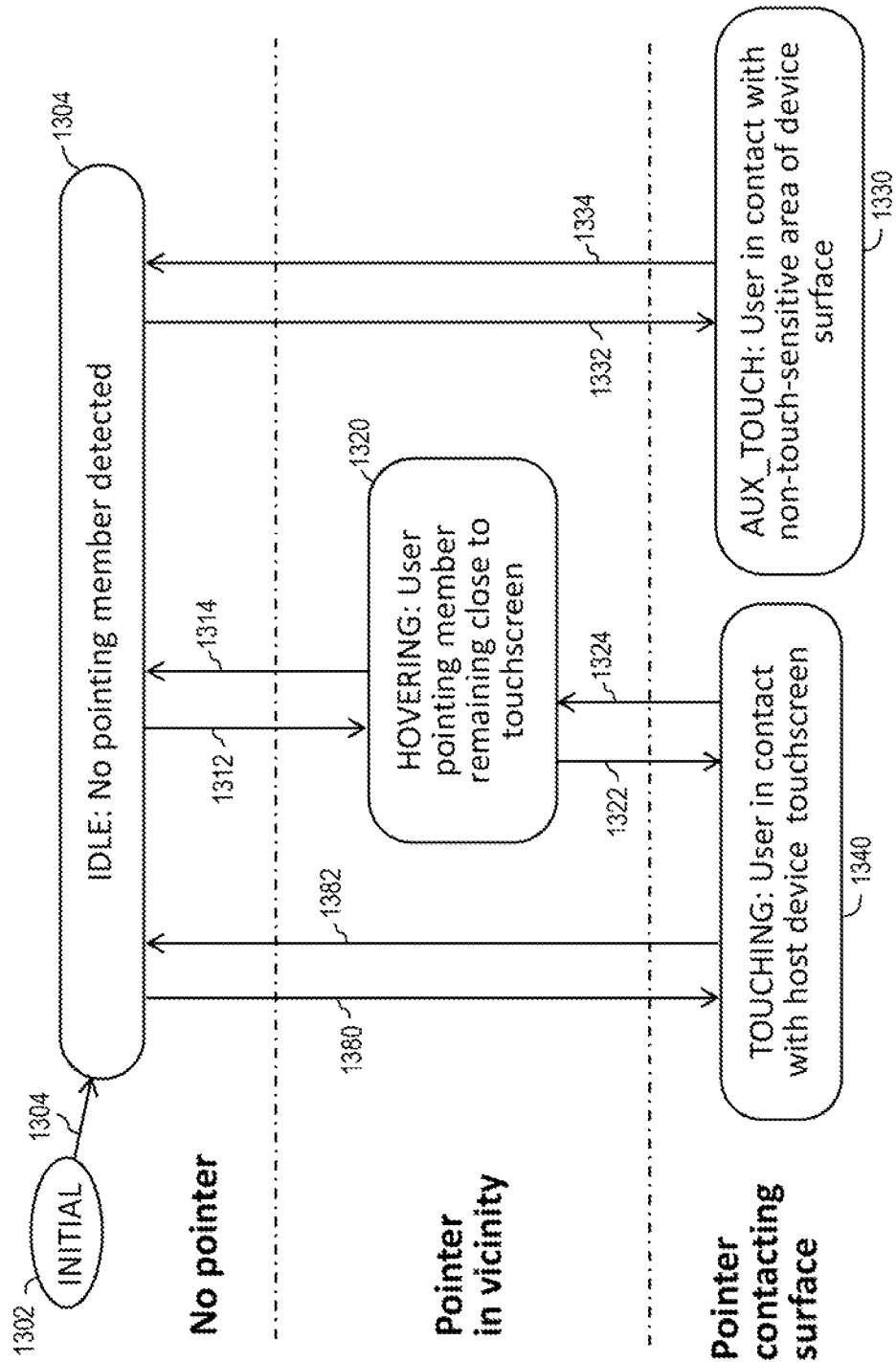
FIG. 13 is a state diagram depicting collaborative operational states among a touchscreen and an auxiliary sensor in accordance with principles described herein.

FIG. 13 is a state diagram 1300 depicting the manner in which a touchscreen device 100, equipped with an auxiliary sensor, may interpret user input gestures based on combinations of input from the auxiliary sensor and the host device's native touchscreen. State diagram 1300 represents the collaborative activities exercised by both the host device (at least the touchscreen portion thereof) and the presently taught auxiliary sensor working together as a collective 'system'. The operation described by state diagram 1300 may be implemented by sensor software processes in CPU sensor for CPU 452 as well as software process is operating in the host device 410 CPU 410.

Four main states are depicted in state diagram 1300 as follows:

The 'IDLE' state 1310 represents the situation in which the auxiliary sensor does not detect a pointing member in the vicinity of the touchscreen, and the touchscreen of the host device does not detect any direct touch. 'TOUCHING' state 1340 represents a condition wherein the touchscreen of the host device is detecting user contact. Transitions 1380 and 1382 represent the jumps between states 1310 and 1340, as detected in the customary fashion by existing touchscreen hardware and firmware. In Apple's iOS, transition 1380 is associated with the creation of a touch-related user interface event object and transition 1382 corresponds to the conclusion of an instance of user touch input. While the user remains in contact with the touchscreen, touch events may be appended to the user interface event object to describe the position of one or more points of contact and any movements of these points over time. Gestural recognition is typically applied to these raw event records to interpret, for example, so-called 'flick' and 'pinch' gestures.

It is worth noting that states 1310, 1340 and transitions 1380, 1382 are typical of existing conventional touchscreen devices wherein the touchscreen simply detects the presence or absence of user contact via electrical capacitance sensing or the like. The remainder of the states and transitions shown are indicative of, but not each required by, useful embodiments according to principles described herein.

The 'HOVERING' state 1320 corresponds to a pointing member remaining within a threshold distance of the touchscreen, but not touching it, for a substantial time. As will be described later, this mode may be achieved according to principles described herein and allows a user to, for example, interact with a displayed interface in an 'exploratory mode' without invoking or acting upon displayed control elements.

Another novel state introduced is the 'auxiliary touch' (AUX_TOUCH) state 1330, indicating that the user is in contact with the surface of device 100 yet the position of contact is outside the boundaries of the normal touch-sensitive region 112. This feature allows for a host device to receive auxiliary user input that can be used in conjunction with, or in addition to, gestural input via the host device touchscreen.

An initial starting point for state diagram 1300 is at 'INITIAL' state 1302 which may correspond to power up of the host device and/or of the auxiliary sensor, loading of software, initialization of processes and program variables related to the other processing that will follow. After any such initialization is completed, then transition 1304 is made immediately and automatically to reach 'IDLE' state 1310. The IDLE state 1310 corresponds to the condition in which there is presently no pointing member detected either in the vicinity of the touchscreen or making actual contact with the touchscreen.

Transition 1312 from an IDLE state to a HOVERING state occurs when certain detection criteria are met based on the operation of process 800 described earlier. These criteria may relate to a quantity of successive qualifying images, a proportion of qualifying images over a period of time (such as 100-500 milliseconds), a persistent Z-axis estimate for a pointing member, or any combination of these. These criteria are intended to help reliably determine when a pointing member is present in a hovering position and to avoid transient indications as might otherwise result from deciding state transitions based on single observations. Application of these criteria to transitioning from IDLE state 1310 to HOVERING state 1320 will be described in connection with FIG. 14.

Complementary to transition 1312, transition 1314 moves from the HOVERING state to the IDLE state and preferably involves applying a corresponding set of 'moving out of hovering' criteria as will be described in conjunction with FIG. 15. These criteria for leaving the HOVERING state provide for some latitude so that only a significant loss of fingertip images or persistent failure to meet other hovering criteria, perhaps confirmed through more than one iteration through process 800, warrants a return to the IDLE state 1310 as indicated by transition 1314.

Once the HOVERING state has been achieved via transition 1312, then the user may remain in this state indefinitely or may at some point contact the touchscreen. The latter occurrence corresponds to transition 1322 wherein the host device touchscreen detects contact in the conventional manner. This determination is made within the host device and the detection of actual touch by the touchscreen overrides the potentially less distinct indication from the auxiliary sensor as to whether the pointing member is affirmatively in contact with the touchscreen or is just very near. (This transition is further described in steps 1508 and 1509 of process 1500 to be described below.)

Once a user is touching the touchscreen and the host device is receiving touch-related user interface events, the user may subsequently lift their finger away from the touchscreen. The user may lift either completely away from the screen, corresponding to transition 1382, or by a short enough distance to return to HOVERING state 1320 as indicated by transition 1324. A method for determining transition 1324 is shown and described below in conjunction with FIG. 16.

As mentioned earlier, a user may alternatively make contact with the surface 110 of device 100 at a location other than where the host device touchscreen 112 is receptive to touch input. Transition 1330 occurs when the auxiliary sensor detects a pointing member apparently in contact with the device but wherein the X-Y coordinates of the point of contact are outside the touchscreen area and instead correspond to a designated auxiliary touch region. (See locations 312 and 313 shown earlier.) Logic for implementing transition 1332 is described below in connection with steps 1422 et seq. in FIG. 14. A corresponding transition 1334 for detecting when a user has 'released' their contact with an auxiliary touch region is also described in FIG. 17.

Note that it may be possible for transitions to occur beyond those shown in FIG. 13, such as between the HOVERING and AUX_TOUCH states. These may readily be implemented according to design preference to encompass, for example, situations of hovering over a non-touch area or sliding onto an auxiliary touch area while leaving one's fingers in contact with the screen. As specifically depicted in FIG. 13, such motion would involve concluding the touchscreen gesture and transitioning through the IDLE state, but alternative approaches may be implemented.

It should also be recognized that, aside from the illustrative embodiment shown, many variations in implementation are possible while fundamentally comporting with principles described herein. For example, FIGS. 14-17, which follow, describe example logic processes for determining transitions in the context of diagram 1300. Throughout these example processes, some steps may be performed either by sensor CPU 452 or host CPU 412 or collaboratively among both processors. The balance of processing burden between the auxiliary sensor device and the host device is a matter of implementation design and a wide range of variations are possible. Accordingly, information conveyed through communications interface may range from fairly raw image data to derived X,Y,Z coordinates or image quality data by virtue of having process 800 largely executed within sensor process 550. Still other alternatives involve the sensor CPU communicating either decided state transitions, per se, or other data supportive of state transition decisions, such as counter values, threshold comparison results, etc. Furthermore, the 'system' state reflected in the state diagram 1300 may be maintained by either one or both of sensor CPU 452 and host CPU 412.

Figure 14:
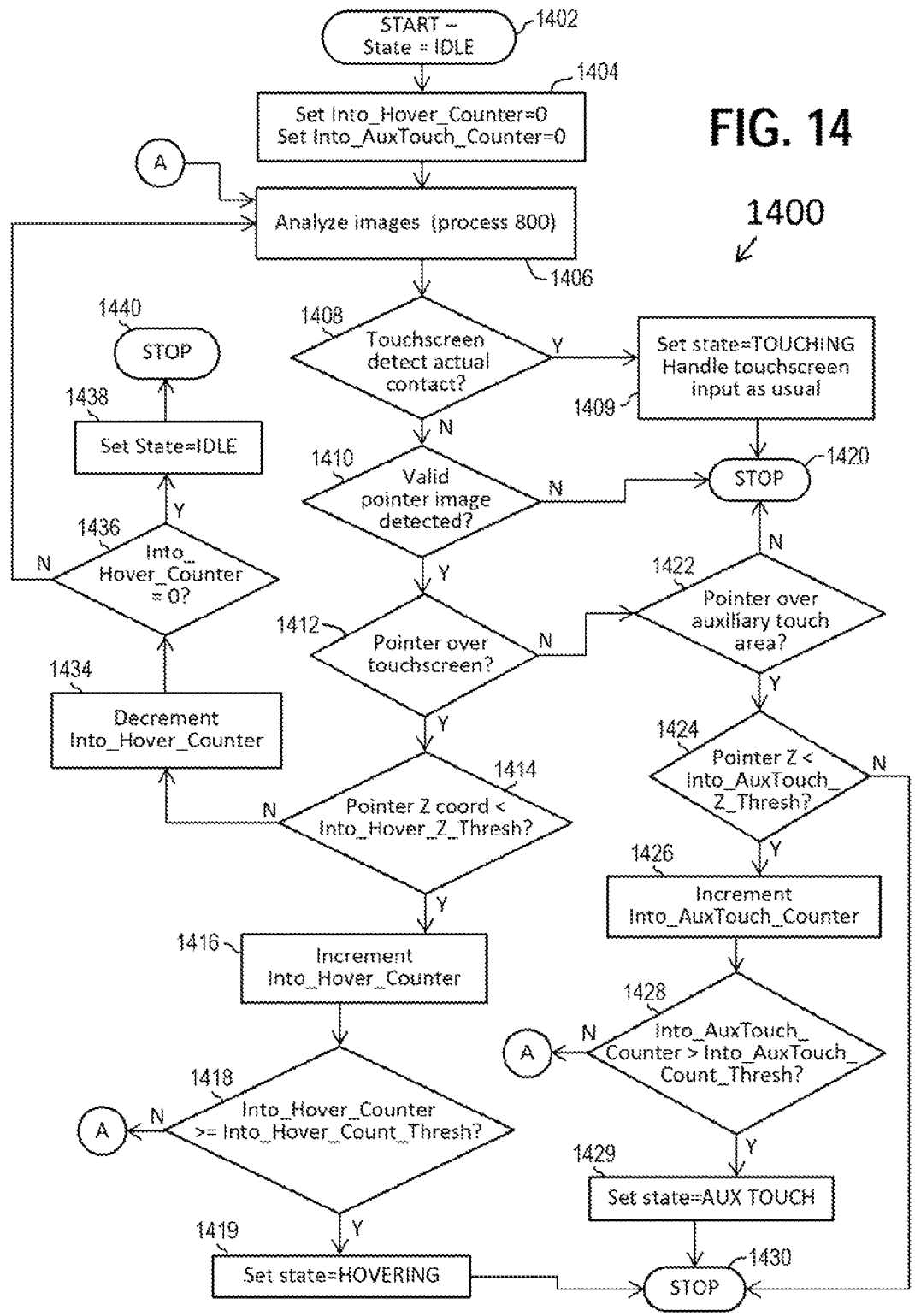
FIGS. 14-17 are flowcharts depicting exemplary processes by which inputs from a touchscreen and an auxiliary sensor may cause transitions among operational states in accordance with principles described herein.

FIG. 14 is a flowchart depicting a process 1400 for determining when to transition out of IDLE state 1310 into one of the other states depicted in diagram 1300. Process 1400 commences with step 1402, with the starting condition being that the system state is currently 'IDLE'. Execution then immediately proceeds to step 1404 to initialize variable Into_Hover_Counter to a starting value, such as zero. As will be explained, this counter is used to tally the number of image analysis cycles (passes through process 800) that indicate a pointing member is within a hovering distance of the touchscreen. The role of this counter will be more clearly described in connection with some of the later steps. Also initialized in step 1404 is an Into_AuxTouch_Counter variable, the role of which is explained below.

Following step 1404, execution then proceeds to step 1406 to obtain and analyze images using process 800 introduced earlier. Next, in step 1408, it is determined whether the host device's touchscreen is detecting actual contact from the user. If so, then execution proceeds to steps 1409 wherein the state is set to 'TOUCHING' and the touchscreen input is handled in the conventional manner, which usually involves instantiating a UI Event object and accumulating touch-related events in association with that software object. The handling of step 1409 completes the processing of the input in accordance with process 1400, per se, and so process 1400 concludes at step 1420.

Returning to step 1408, if it is determined that the touchscreen is not detecting actual user contact, then execution proceeds to step 1410 to determine whether the analysis performed in step 1406 indicates that there is at least a valid pointer image detected, the criteria for which were described earlier in connection with process 800. If no valid pointer image is determined to be present in step 1410, then execution proceeds to step 1420 where process 1400 concludes. Otherwise if, in step 1410, a valid pointer image is detected via process 800, then execution proceeds to step 1412 to compare the apparent X and Y coordinates of the pointer position to the boundaries of the touchscreen.

If, in step 1412, it is determined that the apparent X and Y coordinates of the users pointing member determined in step 1406 are within the boundaries of the device touchscreen, then execution proceeds to step 1414 to further assess the Z coordinate value, that is, the approximate distance between the user's fingertip and the surface of the touchscreen.

Returning to step 1412, if it is determined that the X and Y coordinates of the user's fingertip relative to the touchscreen are such that the user's fingertip is not directly over the touchscreen, then execution proceeds to step 1422 to further determine whether the X and Y coordinates correspond to an auxiliary touch area, such as areas 312 and 313 introduced earlier. If the position of the user's fingertip does not correspond to an auxiliary touch area, then execution proceeds to step 1420 and process 1400 concludes with causing any change of system state. Otherwise, if it is determined that the pointer position is over an auxiliary touch area, then execution proceeds to step 1424 to assess the Z-axis position of the user's pointing member. In support of the determination of step 1422, one or more coordinate values defining the location of each non-touch-sensitive region 312, 313 (as may be established by a user of the device, an application programmer, or an operating system setting) are accessible to the sensor process 550 to the extent that some or all of process 1400 occurs in sensor CPU 452. The auxiliary touch region location data may be accessible to the sensor CPU 452 by being stored in nonvolatile memory 413, or transiently stored in a random-access memory available to the sensor CPU, or communicated to the auxiliary sensor 450 from the host device 410 through a communication link such as USB interface 460.

More specifically, step 1424 involves comparing this distance to a threshold value, namely Into_AuxTouch_Z_Thresh. If the distance between user's fingertip and the touchscreen exceeds this threshold, then the determination is made that the user is not likely not touching the surface of the device and execution proceeds to step 1430 to conclude the processing of process 1400 without changing the state from 'IDLE'. The Into_AuxTouch_Z_Thresh may be a configurable parameter and may well be set to some value less than zero, meaning that the Z-coordinate value estimated by process 800 must indicate an affirmative contact and even some compression of the user's fingertip in order to positively declare a touching condition.

In step 1424, if the apparent Z-axis distance between user's fingertip and the surface is below the Into_AuxTouch_Z_Thresh, then execution proceeds to step 1426 to increment the Into_AuxTouch_Counter. Next, in step 1428, the Into_AuxTouch_Counter is compared to an auxiliary touch qualification threshold (Into_AuxTouch_Count_Thresh). Steps 1426 and 1428 effectively require that a few determinations of the Z-axis position of user's finger must confirm a touching condition. These steps avoid transient false positive touch indications that might result from relying on only single observations. If, in step 1428, it is determined that the counter exceeds the qualification threshold, then execution proceeds to step 1429 to move the system into the auxiliary touch (AUX TOUCH) state and process 1400 concludes in step 1430. Otherwise if, in step 1428, the auxiliary touch counter has not yet met the qualification threshold, then execution returns to step 1406 to acquire and analyze another set of images using process 800.

Returning to step 1412, if it is determined that the X-Y position of the user's fingertip is within the boundaries of the host device touchscreen, then execution proceeds to step 1404 to compare the Z coordinates to an Into_Hover_Z_Thresh value which may be configured to control how closely a fingertip must approach the touchscreen in order to enter the hovering state. If the pointer Z coordinate is greater than the threshold, then execution will proceed to step 1434 wherein the Into_Hover_Counter is decremented because this represents at least one indication that the user's fingertip is positioned in a way that would not qualify as a hovering condition.

The determination as to whether the user's fingertip is at an appropriate range of distances from the touchscreen to constitute hovering is not made based on a single observation but preferably upon a series of observations. Therefore, the Into_Hover_Counter is either decremented in step 1434 or incremented in step 1416 to accumulate a series of positive or negative indications until reaching a conclusion as to whether a sufficient number of indications in one sense or the other warrant changing the state between HOVERING and IDLE. This corresponds to transitions 1380 and 1382 introduced earlier.

Once the Into_Hover_Counter has been decremented in step 1434, then the counter is tested in step 1436. If the counter reaches zero, this means that a significant number of passes through the tests of steps 1408 through 1414 indicate that observed images, as analyzed by process 800, reflect a consistent lack of pointer in a hovering condition. Accordingly, execution then proceeds to step 1438 to set the state to IDLE and the process of analyzing for transitions concludes in step 1440. Otherwise if, in step 1436, the Into_Hover_Counter has not yet reached zero, then execution returns to step 1406 to acquire and analyze yet another set of images to determine if a user's pointing member is close to the touchscreen and whether its location corresponds to hovering distance over the touch sensitive area of the host device.

Returning to step 1414, if it is determined that the pointer Z-coordinate is less than Into_Hover_Z_Thresh, then execution proceeds to step 1418 to increment the Into_Hover_Counter and then this counter is tested in step 1418 against an 'into hover qualification threshold' (Into_Hover_CountThresh). This is another parameter that may be set to determine how many passes through the tests of steps 1408 through 1414 must be successfully made to declare that the user's fingertip is remaining within a certain distance away from the touchscreen. Steps 1410 through 1418 implement criteria for deciding when to undergo transition 1312 shown earlier. If, in step 1418, it is determined that the Into_Hover_Counter value has met the Into_Hover_Count_Thresh value then, in step 1419, the system enters the HOVERING state and process 1400 concludes in step 1430. Otherwise if, in step 1418, it is determined that the Into_Hover_Counter has yet to meet the Into_Hover_Count_Thresh, then execution returns to step 1406 (as shown by connector 'A'), to acquire and analyze further images.

Figure 15:
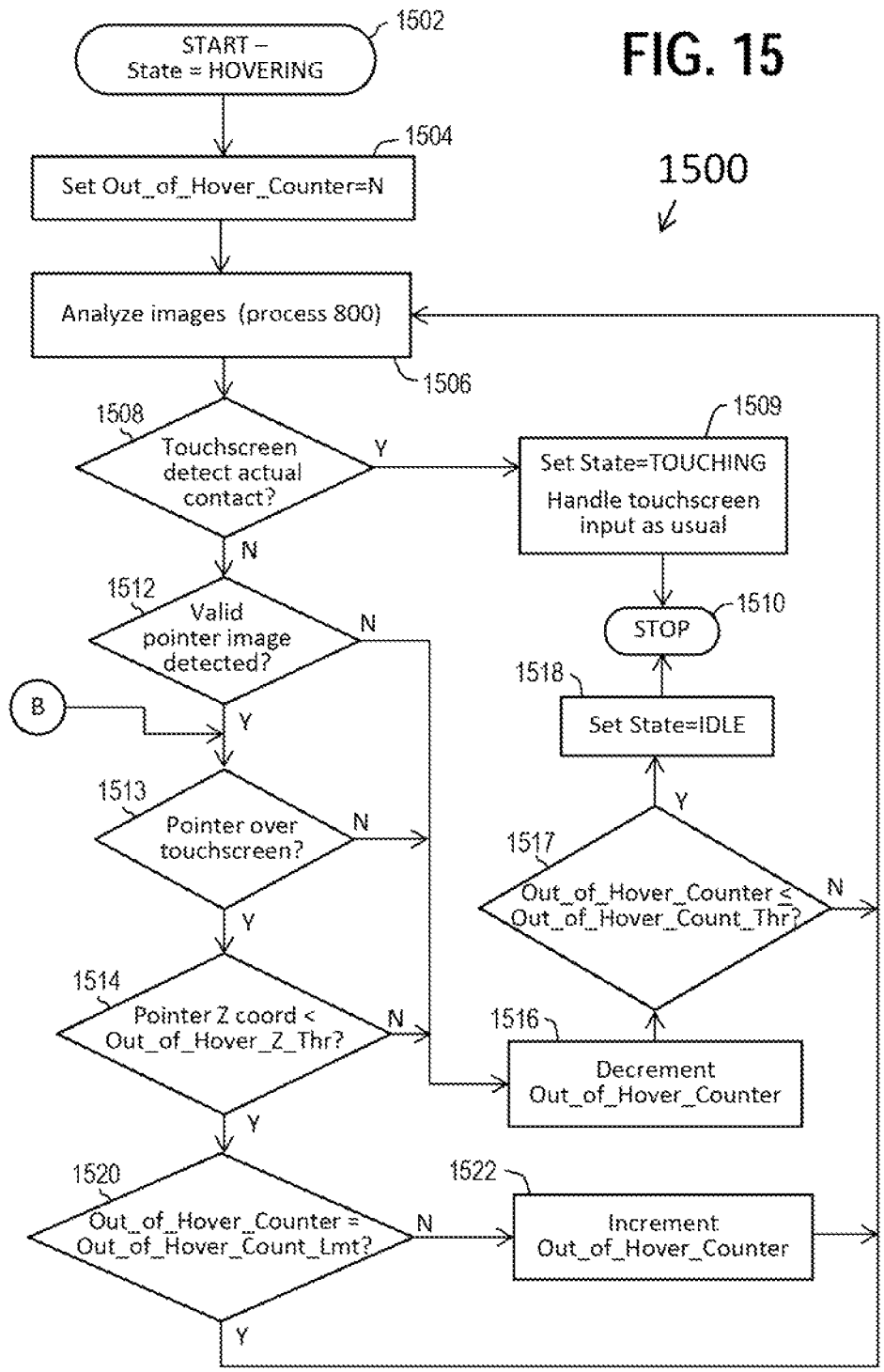

FIG. 15 is a flowchart of an example process 1500 for handling the initial condition that the system is in a HOVERING state and then determining, based upon subsequent image analysis, whether to transition out of the HOVERING state into either the IDLE state or the TOUCHING state as was described in state diagram 1300. Process 1500 commences with step 1502. Step 1502 may be initiated periodically for as long as the system remains in the HOVERING state. For example, step 1502 and the remainder process 1500 may be initiated after the system has entered the HOVERING state as a result of for example, step 1419 explained earlier. Execution immediately proceeds from step 1502 to step 1504 to initialize a variable called 'Out_of_Hover_Counter' to some initial value 'N'. In similar fashion to some of the other counters already described, this counter serves to provide some "stickiness" or some noise tolerance in relation to transitions between the HOVERING state and other states.

After the counter value is initialized in step 1504, then execution proceeds to step 1506 to acquire and analyze images via process 800, with the result being a determination as to whether a user pointing member is in the vicinity of the touchscreen and an estimate of the X, Y and Z coordinates of the user's fingertip relative to the touchscreen. Following this analysis, execution proceeds to step 1508 to determine whether the touchscreen of the host device is detecting actual contact of the user's fingertip(s) with the screen. As mentioned earlier, this contact sensing overrides any indications from the auxiliary sensor and triggers a transition to the TOUCHING state and the normal handling of touchscreen input that occurs along with that.

If it is determined that the touchscreen is detecting actual contact, then execution proceeds to step 1509 to set the system state to 'TOUCHING' and to otherwise handle the touchscreen input in the conventional manner. Process 1500 then concludes at step 1510. Otherwise if, in step 1508, it is determined that the touchscreen is not detecting actual contact by the user, then execution proceeds to step 1512 to assess whether a valid pointer image was detected during step 1506. If not, then execution proceeds to step 1516 to decrement the Out_of_Hover_Counter. Each time the Out_of_Hover_Counter is decremented, it reflects that the user fingertip is less likely in a place that qualifies as a hovering condition.

As can be seen in process 1500, additional tests are applied to the image analysis results to not only determine whether a valid pointer image exists (step 1512) but also to determine whether the X-Y coordinates of the user's fingertip fall within the bounds of the touchscreen (step 1513) and whether the estimated distance between the user's fingertip and the touchscreen continues to be within an acceptable range (step 1514). Out_of_Hover_Z_Thresh is a configurable value that establishes the distance within which a user's fingertip must be maintained relative to the touchscreen in order to continue to be considered within a hovering range.

It is particularly noteworthy that the Into_Hover_Z_Thresh value introduced in step 1414 and the Out_of_Hover_Z_Thresh shown in step 1514 may be configured relative to one another so as to implement a form of hysteresis. That is, the Into_Hover_Z_Threshold may be set to a first Z value that requires the user's fingertip to come fairly close to the touchscreen in order to enter the HOVERING state, whereas the Out_of_Hover_Z_Thresh value may be set to a second Z value, greater that the first Z value, so that once the user is in the HOVERING state they may withdraw their fingertip slightly further away before "dropping out of" the HOVERING state. This practice further reduces transient indications and/or oscillations as to whether the user's fingertip is or is not within a hovering distance from the touchscreen.

As stated above, steps 1512 through 1514 perform a series of tests against certain criteria to ensure that the user's fingertip continues to be within the hovering range of the touchscreen. If any of these tests fail, then step 1516 is undertaken to decrement the value of the Out_of_Hover_Counter after which step 1517 is performed to test the counter value against an out-of-hover disqualification threshold (Out_of_Hover_Count_Thr). If, in step 1517, it is determined that the Out_of_Hover_Counter is still above a disqualification threshold, then execution proceeds to step 1506 to acquire and analyze further images in subsequent iterations of process 800. Otherwise if, in step 1517, is determined that the Out_of_Hover_Counter has fallen below the disqualification threshold—because the Out_of_Hover_Counter has been decremented a number of times by failed criteria tests of step 1512 through 1514 then step 1518 is executed to set the system state to IDLE and then process 1500 concludes in step 1510.

Every time images are acquired and analyzed in step 1506 and then meet all of the criteria established by steps 1508 through 1514, then the Out_of_Hover_Counter will be incremented until it reaches a limit value (Out_of_Hover_Count_Lmt). This operation is implemented by steps 1520 and 1522. Step 1520 is reached when each of the criteria of steps 1508 through 1514 have been met as to the indications of the user fingertip being in a hovering distance. In step 1520, the Out_of_Hover_Counter is tested against a limit value, which is a configurable value to control the reluctance with which process 1500 declares the loss of a HOVERING state. If it is determined in step 1520 that the Out_of_Hover_Counter is not yet at its limit, then step 1522 is executed to increment the Out_of_Hover_Counter before engaging in further iterations of process 800. Otherwise if, in step 1520, the Out_of Hover_Counter is already at a limit, then execution simply proceeds to analyze another set of images in step 1506.

The operation of the Out_of_Hover_Counter as just described causes the system to become more resistant to vacating the hovering state upon a sufficient number of affirmative determinations based on the image analyses. For example, the initial Out_of Hover_Counter value (from step 1504) may be set to a numerical value of 'three' and the limit value to be applied in step 1520 may be set to 'six'. If there are three successful passes through steps 1508 through 1514 that confirm positive indication of a user fingertip in appropriate hovering vicinity to the touchscreen, then the Out_of_Hover_Counter will reach the limit value of 'six'. Thereafter, assuming the hover disqualification threshold equals zero, then it will require six failed passes through 1512 through 1514 to result in reverting to an IDLE state. Transition to the IDLE state might also be accomplished by a series of mixed outcomes wherein the negative indications outnumber the affirmative ones sufficiently to drive the Out_of_Hover_Counter to reach the hover disqualification threshold.

Figure 16:
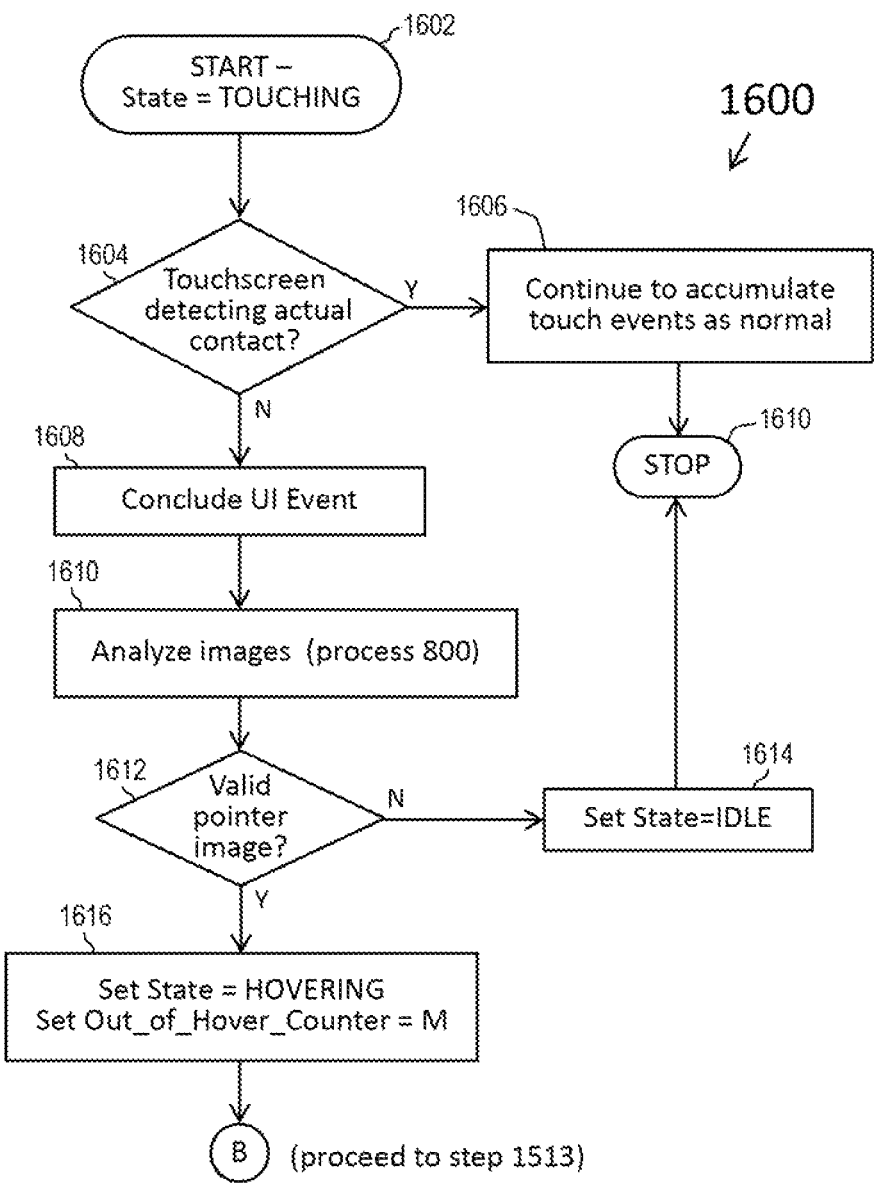

FIG. 16 is a flowchart depicting a process 1600 for assessing when to transition out of the TOUCHING state. Process 1600 commences with step 1602 under the condition that the system is in the TOUCHING state 1340 that was shown in FIG. 13. Process 1600 may be repeated periodically for as long as the system remains in the TOUCHING state. Execution proceeds immediately to step 1604 wherein a determination is made as to whether the user is actually contacting the touchscreen. If so, then execution proceeds to step 1606 to continue to accumulate and process touch-related events in the conventional manner and process 1600 concludes at step 1610. However if, in step 1604, it is determined the user is no longer making contact with the touchscreen, then execution proceeds to step 1608 which, in the well-known manner, concludes the gathering of touch events as part of the user interface event object software object that was created upon initial touching of the touchscreen.

Thereafter, in step 1610, at least one pass is made through collecting and analyzing images via process 800 to determine if a user pointer is observable via the auxiliary sensor cameras. In step 1612, the results of the analysis are checked to see if a valid image corresponding to a user fingertip is present within the field of view of the cameras. If not, then execution proceeds to step 1614 to set the system state to IDLE and then process 1600 concludes in step 1610. Otherwise if, in step 1612, a valid pointer image has been detected then execution proceeds to step 1616 to initialize the Out_of_Hover_Counter, as was introduced in step 1504 earlier, to a value 'M'. This initial value 'M' effectively grants the initially observed fingertip image some credibility that leads to subsequent analyses to verify whether the user fingertip is remaining within a range that corresponds to a hovering condition. Initial value 'M' may be set differently than value 'N' shown earlier such that, in process 1500, the number of affirmative indications needed to confirm a HOVERING state is different if transitioning from a TOUCHING situation versus an IDLE situation.

After initializing the Out_of_Hover_Counter in step 1606 then, as shown by connector 'B', process 1600 causes execution to jump to step 1513 in process 1500. This has the effect of causing the subsequent capture and analysis of images to verify or confirm that the user fingertip is still within a hovering condition. In other words, step 1612 tentatively indicates that the user fingertip may still be at a hovering distance and then turns to the remainder of process 1500 to verify that the hovering indications persist.

Figure 17:
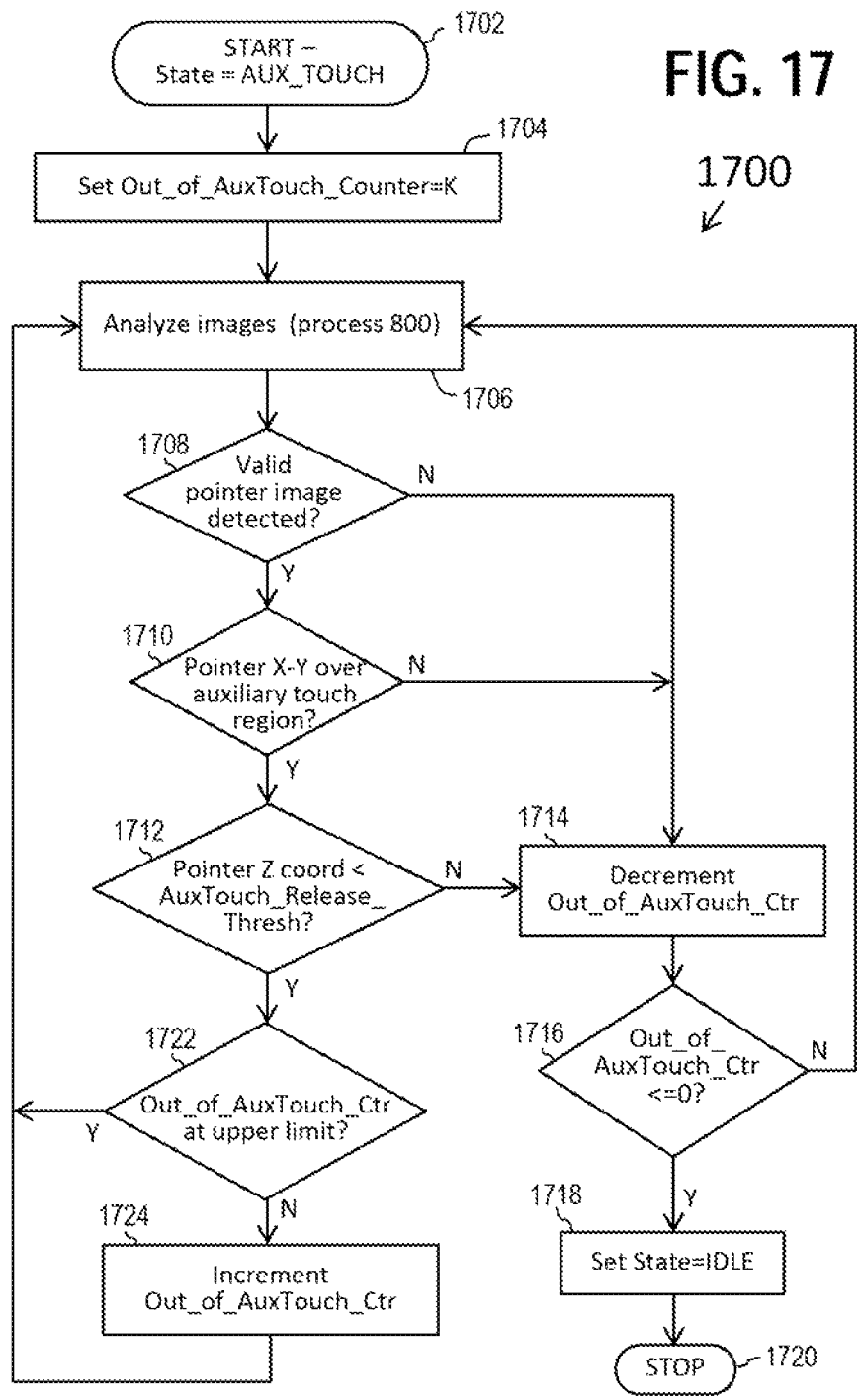

FIG. 17 is a flowchart depicting the steps in a process 1700 by which the system, when already in the auxiliary touch (AUX_TOUCH) state 1330, evaluates whether transition to, for example, IDLE state 1310. Process 1700 commences in step 1702 which stipulates that the current state must be AUX_TOUCH in order for process 1700 to be invoked. This being the case in step 1702, execution proceeds immediately to step 1704 to initialize a variable called Out_of_AuxTouch_Counter to some value 'K'. After this is, done, then execution proceeds to step 1706 to capture and analyze images using the auxiliary sensor cameras and to analyze them using process 800. Thereafter, the results of the image analysis are scrutinized by steps 1708 through 1712. In step 1708, it is determined whether the images include a discernible pointer image. If not, then execution proceeds to step 1740 to decrement the Out_of_AuxTouch_Counter. If, in step 1708, a valid pointer image is detected, then step 1710 is performed to determine whether the X-Y coordinates of the pointer corresponds to an auxiliary touch region such as regions 312 or 313 shown earlier. If the X-Y position of the user's fingertip does not correspond to one of the auxiliary touch regions, then execution proceeds to step 1714 to decrement the Out_of_AuxTouch_Counter. If it is determined in step 1710 that the pointer X-Y coordinates do correspond to an auxiliary touch region, then execution proceeds to step 1712 to assess the Z-coordinate position, which is the distance between the user's fingertip and the surface of the device 100. This distance is compared to an auxiliary touch release threshold value (Aux_Touch_Release_Thresh) which is configurable and may be set to a value somewhat different than the Into_AuxTouch_Z_Thresh introduced earlier in step 1424. The setting of the release threshold at a somewhat more positive value than the touch qualification threshold may provide a hysteresis effect on the confirmation of user touch in an auxiliary region.

If it is determined in step 1712 that the Z-coordinate is greater than the touch release threshold, meaning that the auxiliary sensor detects that the user fingertip may have withdrawn from the surface to some extent, then step 1714 is performed to decrement the Out_of_AuxTouch_Counter. Every time the Out_of_AuxTouch_Counter is decremented by step 1714, the value of this counter is assessed in step 1716 in comparison to a numerical threshold, such as zero. If it is determined that the counter value is at or below this threshold, then execution proceeds to step 1718 to declare a system state of 'IDLE' and then process 1700 concludes in step 1720. If, on the other hand, in step 1716 the Out_of_AuxTouch_Counter remains above zero, then execution returns to step 1706 to again iterate through the process of acquiring and analyzing images to determine the presence and location of a user fingertip in proximity to the surface of device 100.

Returning now to step 1712, if it is determined that the Z-coordinate of the user's fingertip is still within the Aux_Touch_Release_Thresh, then execution proceeds to step 1722 to determine if the Out_of_AuxTouch_Counter has reached an upper limit (Out_of_AuxTouch_Count_Lmt). If so, then the flow of execution simply returns to step 1706. If the Out_of_AuxTouch_Counter has not yet reached the limit then, in step 1724, the Out_of_AuxTouch_Counter is incremented. As with other counters described herein, the incrementing, decrementing and testing of the Out_of_AuxTouch_Counter allows for some buffering of transient indications as might arise from momentary variations in image quality and other factors that can affect detected position of the user's finger proximity to the surface of device 100.

Figure 18:
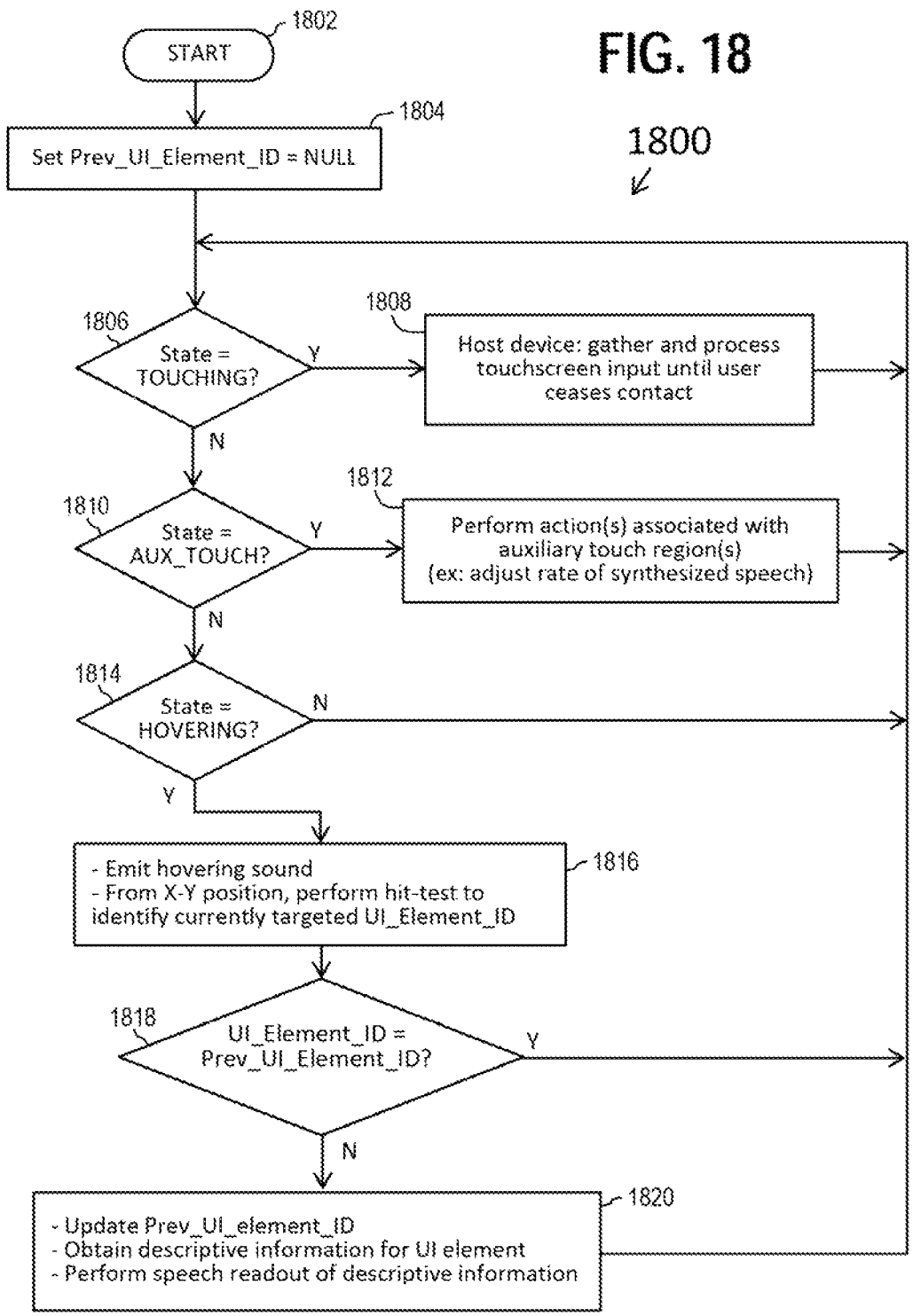
FIG. 18 is a flowchart of an example process by which hovering and auxiliary touch conditions detected by an auxiliary sensor may affect aspects of interaction between a user and a touchscreen device in accordance with principles described herein.

FIG. 18 is a flowchart depicting an example process 1800 by which the detection of hovering conditions or an auxiliary touch condition detected by an auxiliary sensor may be processed and usefully employed to augment the user interface of a host device. Process 1800 commences in step 1802 under the condition that an auxiliary sensor is actively coupled to the host device and that an accessibility function, such as Apple's VoiceOver, is in use to provide audio information in support of using the touchscreen.

Execution in process 1800 then immediately proceeds to step 1804 wherein a variable called 'Prev_UI_Element_ID' is initially set to a 'NULL' value.

As will be explained, this variable is used for determining when the movement of the user's pointing member has moved from one underlying user interface element to another and for triggering new audible announcements of descriptive text as new elements are encountered directly under the user's pointing finger.

Next, in step 1806, a determination is made whether the current state of the combined host device/auxiliary sensor 'system' is equal to the TOUCHING state. If so, then execution proceeds to step 1808 wherein the host device continues to gather and process touchscreen input in the customary fashion the user ceases contact with the touchscreen and the end of the gesture is delineated. Thereafter, execution returns to enter step 1806, perhaps after a slight wait or delay, to again revisit whether the system state has changed. In practice, process 1800, per se, does not need to perform any specific action in step 1808 or necessarily await the completion of the touchscreen processing by the host device before resuming again at step 1806. Furthermore, for simplicity of description here, process 1800 appears to continually or periodically check the system state, which may change at any time by the action of processes 1400 through 1700 described herein. In an alternative implementation, the actions described in process 1800 in response to a change of state may instead be integrated inline within those portions of processes 1400 through 1700 where the current state of the system is changed to various values.

Returning to step 1806, if the current state is not 'TOUCHING', then, in step 1810, the state is checked to see if it equals 'AUX_TOUCH'. If so, then step 1812 is executed wherein any action is performed that is associated with the auxiliary touch region that has been contacted. For one or more auxiliary touch regions (see example regions 312 and 313 of the surface of host device 100 that are not normally touch sensitive but are usefully rendered so using principles described herein) a user, application developer or operating system developer may choose to associate each auxiliary touch region with a particular action, such as toggling an operational mode, simulating user input gestures as might otherwise be entered through the touchscreen, or executing "hotkey" or macro functions.

As one example shown in step 1812, it may be possible to detect the contact of the user with a first auxiliary touch region in order to speed up the rate in which synthesized speech is read. A second auxiliary touch region may serve a complementary role by slowing down the rate at which synthesized speech is read. Normally, a user would have to traverse a menu hierarchy to reach the setting for adjusting the rate of synthesized speech, but auxiliary touch regions may be used to circumvent the usual cumbersome traversal of menus and activation of specific controls, leading to a much more dynamic and immediate control for the benefit of the user. While this action serves as one useful example, it should be kept in mind that a wide variety of actions could potentially be associated with activation of one or more of the auxiliary touch regions.

Other possible functions that can be mapped to one or more auxiliary touch regions include, but are not limited to: turning on and off the auxiliary touch sensor; enabling or disabling the hovering state or its associated sound effects; implementing a "repeat that" functionality; placing the device into a mode where certain touchscreen gestures are converted into alternative, simulated touchscreen gestures; changing the manner in which descriptive text is audibly read to a user (such as controlling the order or content of the text readout); activating or deactivating an audible accessibility function such as Apple's VoiceOver; altering the responsiveness of the hovering mode or the touchscreen itself (such as by changing some of the thresholds or counter limits depicted in FIGS. 14 through 17); or placing the host device in a mode to where it periodically makes a sound or reiterates a recent textual description so that a visually impaired user may more readily locate or resume use of the device if they have momentarily set it aside. In yet another example implementation, the sensing of auxiliary touch may affect whether the association of a VoiceOver cursor with an on-screen control element does or does not track with the user's finger movements while in a HOVERING state.

Returning to step 1810, if the current state is not equal to 'AUX_TOUCH', then execution proceeds to step 1814 to determine if the state equals 'HOVERING'. If not, then the state is presumed to be 'IDLE' and no further action is required—execution proceeds back to step 1806 to continue monitoring for changes in state.

If the current state is found to be 'HOVERING' in step 1814, then execution proceeds to step 1816 wherein (optionally) a special sound effect or background sound is made to confirm to the user that they are in a hovering proximity with respect to the touchscreen. In a preferred embodiment, this sound is a subtle background sound continually made for as long as the system state is 'HOVERING'. Further, in a preferred embodiment, at least one attribute of the sound, such as a tonal quality, is proportional to or indicative of the momentary Z-axis distance between the user's fingertip and the touchscreen. For example, the sound effect may be filtered pink noise in which the filter center frequency is proportional to the distance. This effect may progress either toward a very low or very high frequency as the user comes into near contact with the touchscreen surface. This behavior gives the end-user an intuitive sense of their proximity as they approach the touchscreen to make contact.

Furthermore in step 1816, the X and Y positions of the user's pointing member, as derived via process 800, are used to perform a so-called 'hit-test' process to determine which one of perhaps many user interface elements displayed under the touchscreen is currently indicated by where the user is pointing. This well-known process, introduced with the early window-based user interfaces, yields a single unique element 'handle' or element identifier, which will be referred to here as the 'Targeted_UI_Element_ID'. Next, in step 1818, the element identifier found in step 1816 is compared to the value of variable 'Prev_UI_Element_ID', which will have been populated based on a previous determination by step 1816. If the current element identifier is equal to the previously determined element identifier, this means that the user's fingertip is still pointing at the same element as during the previous pass through process 1800. Assuming that it is desired that elements are to be announced exactly once as they are encountered, no additional action is necessary because the element will have already been previously announced. Otherwise, if the element ID derived in step 1816 is different than the previously obtained element ID, this means that a new element has been encountered under the user's fingertip and it is appropriate to announce the descriptive text associated with the newly indicated element. If that is the case, then step 1820 is performed to copy the value of Targeted_UI_Element ID into the Prev_UI_Element_ID, to obtain the descriptive information for the newly identified user interface element and them to perform a text-to-speech conversion and audible readout of the descriptive information. After performing this action, then execution oops back to step 1806 to continue checking for changes in state.

In some implementations, some of the functions depicted in FIG. 18, such as the functions of obtaining descriptive information pertaining to user interface elements and performing text-to-speech conversion, involve or are already performed by existing components, such as the VoiceOver functionality in the iPhone and iPad products marketed by Apple. As depicted for instructive purposes, process 1800 is intended to show what the host device and auxiliary sensor may collectively accomplish without dependence on whether, using an iPhone as an example, the VoiceOver functionality itself is modified or makes interfaces available to other applications, whether a helper application 516 acts as an interpreter of the information provided by auxiliary sensor and acts as a 'wrapper' to work with the existing VoiceOver functionality, or whether an entirely separate audible accessibility application is overlaid within the host device to enable the level of control characterized in process 1800.

For example, in one potential embodiment involving VoiceOver on an iPhone, the movement of a user's fingertip while maintained within a hovering distance might be converted into "synthetic" touch events (for example, by a help application or an interface within the VoiceOver functionality) such that the VoiceOver functionality handles this action as if a user were contacting the screen. Furthermore, an actual single-tap gesture might be converted into a "synthetic" double-tap gesture to cause the existing VoiceOver functionality to actuate the selected icon or other displayed control. In this manner, descriptive audio is provided using the native VoiceOver functionality but the interpretation of touchscreen gestures mimics the typical non-VoiceOver paradigm. A user unaccustomed to the altered gestures that typically accompany VoiceOver usage may more readily use the device using familiar gestures, while ignoring or perhaps benefiting from the audible descriptions.

The following co-pending U.S. Patent Applications are hereby incorporated by reference in their entireties: "Auxiliary Sensor for Touchscreen Device" Ser. No. 13/837,715 filed on even date herewith; and "Method and Apparatus for Facilitating Use of Touchscreen Devices" Ser. No. 13/838,603 filed on even date herewith.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a limiting sense.

What is claimed is:

1. An apparatus comprising:
   a housing configured to attach to a computing device, the computing device having at least one surface on which at least a portion is a touch-sensitive region to receive user input for the computing device;
   at least one image sensor array disposed in the housing in a position such that, when the housing is attached to the computing device, an image formed on the image sensor array includes: at least a portion of the surface of the computing device, a direct first view of an object near the surface, and a reflected second view of the object as reflected from the surface;
   a processor receiving, from the image sensor array, image data corresponding to the image and performing image analysis of the image data to determine attribute data for the object; and
   a communications interface configured to communicate the attribute data between the processor and the computing device;
   wherein the attribute data comprises a corrected distance between the object and the surface and wherein the corrected distance is computed by analysis of the image data by the processor to determine an apparent distance between the object and the surface, to determine a distance between the object and the image sensor array, and to scale the apparent distance in proportion to the distance between the object and the image sensor array.

2. The apparatus of claim 1 wherein the attribute data comprises at least one of: an indication of whether the object is a user's pointing member, an indication of whether the object adequately conforms to a shape model, an indication of whether the first view of the object meets one or more criteria, an indication of whether the second view of the object meets one or more criteria, an indication of whether the first view and second view of the object collectively meet one or more criteria, an indication of whether a distance between the object and the surface is less than a threshold value, and an indication of whether the object is positioned above the touch-sensitive region.

3. The apparatus of claim 1 further comprising:
   at least one light-emitting element controlled by the processor;
   wherein the processor controls whether the light-emitting element emits light to illuminate the object in the image.

4. The apparatus of claim 3 wherein the processor is further configured to obtain a first instance of the image without illumination from the light-emitting element, to obtain a second instance of the image with illumination from the light-emitting element, and to compare the first and second images to compute the attribute data.

5. The apparatus of claim 1 further comprising:
   a plurality of light-emitting elements disposed within the housing and wherein the processor is configured to cause light to be emitted from a first set of one or more of the light-emitting elements while a first instance of the image is obtained and to cause light to be emitted from a second set of one or more of the light-emitting elements while a second instance of the image is obtained and to perform image analysis on at least one of the first and second instances and to compute the attribute data.

6. The apparatus of claim 1 wherein the apparatus comprises:
   a first image sensing array disposed at a first location in the housing;
   a second image sensor array disposed at a second location in the housing;
   wherein the processor determines the attribute data by:
      receiving image data from the first image sensing array and second image sensor array;
      determining by image analysis of the image data, a first positional coordinate of the object within a field of view of the first image sensor array;
      determining by image analysis of the image data, a second positional coordinate of the object within a field of view of the second array; and
      computing, from the first and second positional coordinates, a third positional coordinate of the object relative to the touch-sensitive surface.

7. The apparatus of claim 1 wherein the surface of the computing device comprises at least one non-touch-sensitive region and wherein the processor accesses a memory containing data related to the location of the non-touch-sensitive region and wherein the processor is further configured to analyze the image data to determine whether a position of the object corresponds to the non-touch-sensitive region.

8. The apparatus of claim 7 wherein the attribute data includes an indication based on the determination of whether the position of the object corresponds to the non-touch-sensitive region.

9. The apparatus of claim 1 wherein the processor performs image analysis on the image data to compute an observed distance between the object and the surface, compares the observed distance to a threshold value, and includes in the attribute data an indication as to the result of the comparison.

10. The apparatus of claim 9 wherein the threshold value is set at less than or equal to about twelve millimeters.

11. The apparatus of claim 1 wherein the communications interface communicates data through a first electrical connector disposed in the housing that mates with a second electrical connector of the device.

12. The apparatus of claim 1 wherein the communications interface communicates data through a near-field wireless link.

13. A method comprising:
on a computing device having at least one surface of which at least a portion is a touch-sensitive region to receive user input for the computing device, receiving first image data from a first image sensor array adjacent to the surface of the computing device, wherein the first image data is representative of a first image that includes: at least a portion of the surface of the computing device, a first view of an object near the surface, and a second view of the object as reflected from the surface;
performing image analysis of the first image data to determine attribute data for the object; and
communicating the attribute data to the computing device;
wherein the attribute data comprises a corrected distance between the object and the surface, wherein the corrected distance is computed by analysis of the first image data to determine an apparent distance between the object and the surface, to determine a distance between the object and the first image sensor array, and to scale the apparent distance in proportion to the distance between the object and the first image sensor array.

14. The method of claim 13 wherein the attribute data comprises at least one of: an indication of whether the object is a user's pointing member, an indication of whether the object adequately conforms to a shape model, an indication of whether the first view of the object meets one or more criteria, an indication of whether the second view of the object meets one or more criteria, an indication of whether the first view and second view of the object collectively meet one or more criteria, an indication of whether a distance between the object and the surface is less than a threshold value, and an indication of whether the object is positioned above the touch sensitive region.

15. The method of claim 13 further comprising:
obtaining a first instance of the first image without illumination from a light emitting element adjacent to the surface of the device;
obtaining a second instance of the first image with illumination from the light emitting element; and
comparing the first and second images to compute the attribute data.

16. The method of claim 13 further comprising:
providing a plurality of light-emitting elements;
controlling a first set of one or more light-emitting elements to emit light while a first instance of the first image data is obtained, the one or more light-emitting elements positioned in proximity to the surface of the computing device to illuminate a vicinity above the surface of the computing device;
controlling a second set of one or more of the light-emitting elements to emit light while a second instance of the first image data is obtained; and
performing image analysis on at least one of the first and second instances of the first image data to determine the attribute data.

17. The method of claim 13 further comprising:
receiving second image data from a second image sensor array adjacent to the surface of the computing device, but at a location apart from the first image sensor array, the second image data representing a second image that includes: at least a portion of the surface of the computing device, a third view of the object near the surface, and a fourth view of the object as reflected from the surface;
analyzing the first image data to determine a first positional coordinate of the object within a field of view of the first image sensor array; and
analyzing the second image data to determine a second positional coordinate of the object within a field of view of the second image sensor array;
wherein the determining the attribute data comprises computing, from the first and second positional coordinates, a third positional coordinate of the object relative to the touch-sensitive surface.

18. The method of claim 13 further comprising:
obtaining first location data pertaining to at least one non-touch-sensitive region of the surface of the computing device; and
analyzing the first image data to determine second location data pertaining to the object;
comparing the first and second location data to determine whether the object location coincides with the non-touch-sensitive region.

19. The method of claim 18 further comprising:
wherein the attribute data includes an indication based on the determination of whether the position of the object coincides with the non-touch-sensitive region.

20. The method of claim 13 further comprising:
analyzing the image data to determine an observed distance between the object and the surface;
performing a comparison of the observed distance to a threshold distance, the threshold distance pertaining to a distance between the object and the surface; and
including an indication in the attribute data based upon a result of the comparison.

21. The method of claim 20 wherein the threshold value is set at less than or equal to about twelve millimeters.

22. A non-transitory computer-readable medium associated with a computing device having at least one surface of which at least a portion is a touch-sensitive region to receive user input for the computing device, the computer-readable medium comprising:
a plurality of computer-executable instructions, which, when executed by one or more processors, cause the one or more processors to:
receive first image data from a first image sensor array adjacent to the surface of the computing device, wherein the first image data is representative of a first image that includes: at least a portion of the surface of the computing device, a first view of an object near the surface, and a second view of the object as reflected from the surface;
perform image analysis of the first image data to determine attribute data for the object; and
communicate the attribute data to the computing device;

wherein the attribute data comprises a corrected distance between the object and the surface, wherein the corrected distance is computed by analysis of the first image data to determine an apparent distance between the object and the surface, to determine a distance between the object and the first image sensor array, and to scale the apparent distance in proportion to the distance between the object and the first image sensor array.

23. The non-transitory computer-readable medium of claim 22, wherein the plurality of computer-executable instructions, when executed by one or more processors, cause the one or more processors to:

obtain a first instance of the first image without illumination from a light emitting element adjacent to the surface of the device;

obtain a second instance of the first image with illumination from the light emitting element; and compare the first and second images to compute the attribute data.

24. The non-transitory computer-readable medium of claim 22, wherein the plurality of computer-executable instructions, when executed by one or more processors, cause the one or more processors to:

provide a plurality of light-emitting elements;

control a first set of one or more light-emitting elements to emit light while a first instance of the first image data is obtained, the one or more light-emitting elements positioned in proximity to the surface of the computing device to illuminate a vicinity above the surface of the computing device;

control a second set of one or more of the light-emitting elements to emit light while a second instance of the first image data is obtained; and perform image analysis on at least one of the first and second instances of the first image data to determine the attribute data.

25. The non-transitory computer-readable medium of claim 22, wherein the plurality of computer-executable instructions, when executed by one or more processors, cause the one or more processors to:

receive second image data from a second image sensor array adjacent to the surface of the computing device, but at a location apart from the first image sensor array, the second image data representing a second image that includes: at least a portion of the surface of the computing device, a third view of the object near the surface, and a fourth view of the object as reflected from the surface;

analyze the first image data to determine a first positional coordinate of the object within a field of view of the first image sensor array; and analyze the second image data to determine a second positional coordinate of the object within a field of view of the second image sensor array;

wherein the determining the attribute data comprises computing, from the first and second positional coordinates, a third positional coordinate of the object relative to the touch-sensitive surface.

* * * * *